(12) United States Patent
Amrutur et al.

(10) Patent No.: US 8,737,547 B2
(45) Date of Patent: May 27, 2014

(54) ADAPTIVE DIGITAL BASEBAND RECEIVER

(75) Inventors: Bharadwaj Amrutur, Karnataka (IN); Satyam Dwivedi, Bihar (IN); Navakanta Bhat, Bangalore (IN)

(73) Assignee: Indian Institute of Science, Karnataka (IN)

( * ) Notice: Subject to any disclaimer, the term of this patent is extended or adjusted under 35 U.S.C. 154(b) by 261 days.

(21) Appl. No.: 12/645,695

(22) Filed: Dec. 23, 2009

(65) Prior Publication Data

US 2011/0096875 A1 Apr. 28, 2011

(30) Foreign Application Priority Data

Oct. 26, 2009 (IN) .......................... 2596/CHE/2009

(51) Int. Cl.
*H04B 1/00* (2006.01)

(52) U.S. Cl.
USPC ........................................................ 375/346

(58) Field of Classification Search
USPC ................. 375/340, 346, 267, 130, 147, 260; 370/206, 342; 455/226.1, 226.2, 226.3
See application file for complete search history.

(56) References Cited

U.S. PATENT DOCUMENTS

| | | | |
|---|---|---|---|
| 3,536,531 A | 10/1970 | Sekido et al. | |
| 4,326,017 A | 4/1982 | Will | |
| 6,129,822 A | 10/2000 | Ferdman | |
| 6,298,221 B1 | 10/2001 | Nguyen | |
| 6,352,622 B1 | 3/2002 | Brown et al. | |
| 6,507,603 B1 * | 1/2003 | Haga et al. | 375/147 |
| 6,980,786 B1 | 12/2005 | Groe | |
| 7,299,021 B2 | 11/2007 | Parssinen et al. | |
| 7,773,681 B2 * | 8/2010 | Koo et al. | 375/260 |
| 2003/0124999 A1 * | 7/2003 | Parssinen et al. | 455/226.1 |
| 2006/0222098 A1 * | 10/2006 | Sedarat et al. | 375/260 |
| 2007/0064839 A1 | 3/2007 | Luu | |
| 2007/0128472 A1 | 6/2007 | Tierney et al. | |

FOREIGN PATENT DOCUMENTS

| | | |
|---|---|---|
| CN | 101420239 A | 4/2009 |
| WO | WO 03/098648 | 11/2003 |
| WO | WO 2005/027255 | 3/2005 |
| WO | WO 2007/001201 | 1/2007 |
| WO | WO 2007/001202 | 1/2007 |
| WO | WO 2009/052124 | 4/2009 |

OTHER PUBLICATIONS

Jondral, F. K., "Software-Defined Radio—Basics and Evolution to Cognitive Radio," EURASIP Journal on Wireless Communications and Networking, 2005, Issue: 3, pp. 275-283.

(Continued)

*Primary Examiner* — Sam K Ahn
*Assistant Examiner* — Shawkat M Ali
(74) *Attorney, Agent, or Firm* — Brundidge & Stanger, P.C.

(57) ABSTRACT

An adaptive digital baseband receiver is described in which operating parameters of the receiver, such as bit-widths and operating frequencies, are determined that achieve a target bit-error-ratio (BER) as a function of received signal-to-noise ratio (SNR) and interference levels in a wireless channel and enable the receiver to consume a minimum amount of power. Over consumption of power may be avoided due to a functional relationship between optimal resolution and input signal conditions. In exemplary embodiments, the adaptive digital receiver is provided that adjusts bit-widths and operating frequency at power efficient levels while meeting a target BER. Simulations can be used to determine a relation between bit-width, operating frequency, and input signal conditions, for example.

15 Claims, 15 Drawing Sheets

(56) References Cited

OTHER PUBLICATIONS

Kim, D. -S., et al., "A Wireless Sensor Node Processor with Digital Baseband based on Adaptive Threshold Adjustment for Emotional Lighting System," IEEE Transactions on Consumer Electronics, Nov. 2006, vol. 52, Issue: 4, pp. 1362-1367.

Naskas, N., and Papananos, Y., "A Convergence-Free Predistortion Technique for Adaptive Linearisation of RF Power Amplifiers," Analog Integrated Circuits and Signal Processing, 2004, vol. 41, Issue 2-3, pp. 109-118.

Oh, N. -J., and Lee, S. -G., "Building a 2.4 GHz radio transceiver using 802.15.4," IEEE Circuits and Devices Magazine, Nov./Dec. 2005, vol. 21, Issue: 6, pp. 43-51.

Vaughan, R. G., et al., "The Theory of Bandpass Sampling," IEEE Transactions on Signal Processing, Sep. 1991, vol. 39, Issue. 9, pp. 1973-1984.

IEEE 802.15.4, IEEE Standard for Information Technology—Telecommunications and Information Exchange Between Systems—Local and Metropolitan Area Networks Specific Requirements Part 15.4: Wireless Medium Access Control (MAC) and Physical Layer (PHY) Specifications for Low-Rate Wireless Personal Area Networks (LR-WPANs), 2003.

International Search Report and Written Opinion issued by the Australian Patent Office in PCT/IB2010/054044, dated Dec. 22, 2010.

Dwivedi, S., et al., "Power Scalable Radio Receiver Design Based on Signal and Interference Condition", J. Low Power Electron, Appl., Oct 23, 2012, 2, 242-264.

Tasic, Aleksandar, Lim, Su-Tarn, Serdijn, Wouter a., and Long, John R., "Design of Adaptive Multimode Rf Front-End Circuits," IEEE Journal of Solid-State Circuits, Feb. 2007, vol. 42, No. 2, pp. 313-322.

Dennis Gee-Wai Yee, "A Design Methodology for Highly-Integrated Low-Power Receivers for Wireless Communications", PhD Thesis, UC Berkeley, 2001.

Miller, P. and Cesari, R., "Wireless communication: Signal conditioning for IF sampling", Available: http://focus.ti.com/lit/ml/sloa085/sloa085.pdf., 2003.

Asad A. Abidi, "The Path to the Software-Defined Radio Receiver," IEEE Journal of Solid-State Circuits, Jun. 2007, vol. 42, No. 5, pp. 954-966.

Dwivedi, Satyam, Amrutur, Bharadwaj, and Bhat, Navakanta, "Optimizing Resolution of Signals in a Low-If Receiver," in ISSCS. IEEE, Jul. 2007.

The free encyclopedia from Wikipedia, "Binomial distribution," http://en.wikipedia.org/wiki/Binomial_distribution, Jul. 28, 2010.

Kush Gulati, "A Low-Power Reconfigurable Analog-to-Digital Converter", Ph.D. thesis, Massachusetts Institute of Technology (MIT), 2001.

Zander, Jens, "Distributed Cochannel Control in Cellular Radio Systems Interference," IEEE Transactions on Vehicular Technology, Aug. 1992, vol. 41, No. 3, pp. 305-311.

Kim, Jae Joon; Jin, Kyu Tae; Lee, Do Hoon and Park, Sung-Bum, "A CMOS Single-Chip Wireless Solution with an Adaptive Purity-Control Scheme Against Ism-Band Interferences," IEEE Transactions of Circuits and Systems—II: Analog and Digital Signal Processing, Apr. 2006, vol. 53, No. 4, pp. 269-273.

Namgoong, Won; Reader, Sydney and Meng, Teresa H., "An All-Digital Low-Power IF GPS Synchronizer," IEEE Journal of Solid-State Circuits, Jun. 2000, vol. 35, No. 6, pp. 856-864.

Nam, Ilku; Choi, Kyudon; Lee, Joonhee; Cha, Hyouk-Kyu; Seo, Bo-Ik; Kwon, Kuduck and Lee, Kwyro, "A 2.4-GHz Low-Power Low-IF Receiver and Direct-Conversion Transmitter in 0.18-µ m CMOS for IEEE 802.15.4 WPAN Applications," IEEE Transactions on Microwave Theory and Techniques, Apr. 2007, vol. 55, No. 4, pp. 682-689.

Lauwers, Erik and Gielen, Georges, "Power Estimation Methods for Analog Circuits for Architectural Exploration of Integrated Systems," IEEE Transactions on Very Large Scale Integration (VLSI) Systems, Apr. 2002, vol. 10, No. 2, pp. 155-162.

Cho, K.M., "Optimum Gain Control for A/D Conversion Using Digitized I/Q Data in Quadrature Sampling", IEEE Transactions on Aerospace and Electronic Systems, vol. 27, Issue 1, pp. 178-181, Jan. 1991.

Kim, Chang-Joo; Lee, Hyuck-Jae and Lee, Hwang-Soo, "Adaptive Acquisition of PN Sequences for DSSS Communications", IEEE Transactions on Communications, vol. 46, Issue 8, pp. 993-996, Aug. 1998.

* cited by examiner

| Interference attenuation | No. of bits | Sampling Frequency (MHz), Power (µw) | | | | | | | |
|---|---|---|---|---|---|---|---|---|---|
| | | SNR = -7 dB | SNR = -6 | SNR = -5 | SNR = -4 | SNR = -3 | SNR = -2 | SNR = -1 | SNR = 0 |
| Case-I No interference Only noise | 1 | * | 60 | 16 | 10 | 8 | 7 | 4 | 4 |
| | 2 | 40 | 13 | 8 | 7 | 6 | 4 | 4 | 1 |
| | 4 | 35 | 13 | 8 | 8 | 4 | 1 | 1 | 1 |
| | 8 | 28 | 13 | 8 | 3 | 3 | 1 | 1 | 1 |
| Case-II No Alternate Adjacent-Standard Specific | 1 | * | * | * | * | * | * | * | * |
| | 2 | * | * | * | * | * | * | * | * |
| | 4 | 80 | 22 | 9 | 8 | 8 | 8 | 8 | 7 |
| | 8 | 55 | 12 | 9 | 8 | 8 | 8 | 8 | 7 |
| Case-III No Adjacent Alternate-Standard Specific | 1 | * | * | * | * | * | * | * | * |
| | 2 | * | 80 | 50 | 35 | 60 | 40 | 27 | 23 |
| | 4 | 50 | 13 | 13 | 12 | 27 | 25 | 19 | 19 |
| | 8 | 40 | 14 | 12 | 7 | 4 | 4 | 4 | 4 |
| Case-IV Standard Specific | 1 | * | * | * | * | * | * | * | * |
| | 2 | * | * | * | * | * | * | * | * |
| | 4 | 80 | 23 | 14 | 13 | 13 | 13 | 13 | 7 |
| | 8 | 55 | 14 | 13 | 13 | 7 | 7 | 7 | 7 |

FIGURE 16

ADAPTIVE DIGITAL BASEBAND RECEIVER

CROSS-REFERENCE TO RELATED APPLICATION

The present application claims priority under 35 U.S.C. §119 to a corresponding patent application filed in India and having application number 2596/CHE/2009, filed on Oct. 26, 2009, the entire contents of which are herein incorporated by reference.

BACKGROUND

Radio communication has become an integral aspect of everyday life in modern society, with a broad range of possible applications. Regardless of the application, clear communication between radio transmitters and radio receivers may be desired. Clear radio communication may depend on a number of factors including, for example, signal strength, noise introduced by a transmitter/receiver device, and interference power within wireless communication channels through which wireless signals are communicated.

In radio receiver circuit designs, high amplifier gain linearity and minimal noise figures are desirable to meet certain design requirements so as to enable clear radio communications, for example. Noise is an undesirable product of electronic devices and components. One metric for noise figures is a noise factor, which is a measure of how much noise is introduced into a signal being amplified during an amplification process. A noise factor can be a ratio of a signal-to-noise ratio (SNR) of an input signal to the SNR of the amplified output signal. Other sources of noise to consider include input thermal noise in the receiver circuit as well as quantization noise of analog-to-digital converters (ADC) in the receiver circuit, for example. To enable clear radio communications, noise levels are to be lowered.

Radio receivers are often designed to meet a worst case scenario for received signal strength, noise of the devices, and interference power. For example, a receiver is usually designed to be able to receive/decode a signal with a weak signal-strength during high interference conditions. However, it is often the case that conditions are not that bad when operating the receiver. For example, a worst-case scenario may occur a small portion of the time when operating the receiver, and it is more likely that better than worst-case conditions are present a majority of the time. As such, over-design of receiver components is common and results in a waste of power operating the receiver when channel conditions are more benign. This presents an area where power optimization can be improved.

SUMMARY

In exemplary embodiments, a method of determining operating parameters of a receiver is provided. The method includes receiving a radio frequency (RF) input signal over a wireless channel, determining a signal strength of the RF input signal, and determining interference in the wireless channel. The method further includes, based on the signal strength of the RF input signal and the interference in the wireless channel, determining operating parameters for the receiver that meet a target bit-error-ratio (BER) and minimize power consumption by the receiver.

In other aspects, exemplary embodiments include a computer readable medium that has stored therein instructions executable by a computing device to cause the computing device to perform the functions of receiving a radio frequency (RF) input signal over a wireless channel, determining a signal strength of the RF input signal, and determining interference in the wireless channel. The functions further include, based on the signal strength of the RF input signal and the interference in the wireless channel, determining operating parameters for the receiver that meet a target bit-error-ratio (BER) and minimize power consumption by the receiver.

In other aspects, exemplary embodiments include a receiver comprising an analog front-end and a digital processing unit for receiving a radio-frequency (RF) signal over a wireless channel and operating at a resolution and a frequency. The receiver further includes a control unit for determining a signal strength of the RF signal and an interference in the wireless channel, and based on the signal strength and the interference, for determining adjustments to the resolution and the frequency at which to operate the analog front-end and digital processing unit so as to minimize power consumption by the analog front-end and digital processing unit and to meet a target bit-error-ratio (BER) for the receiver.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 16 illustrates an example table with results of a simulation that show example sampling frequencies and bit-widths for different interference and SNR values for a receiver.

DETAILED DESCRIPTION

Figure 1:
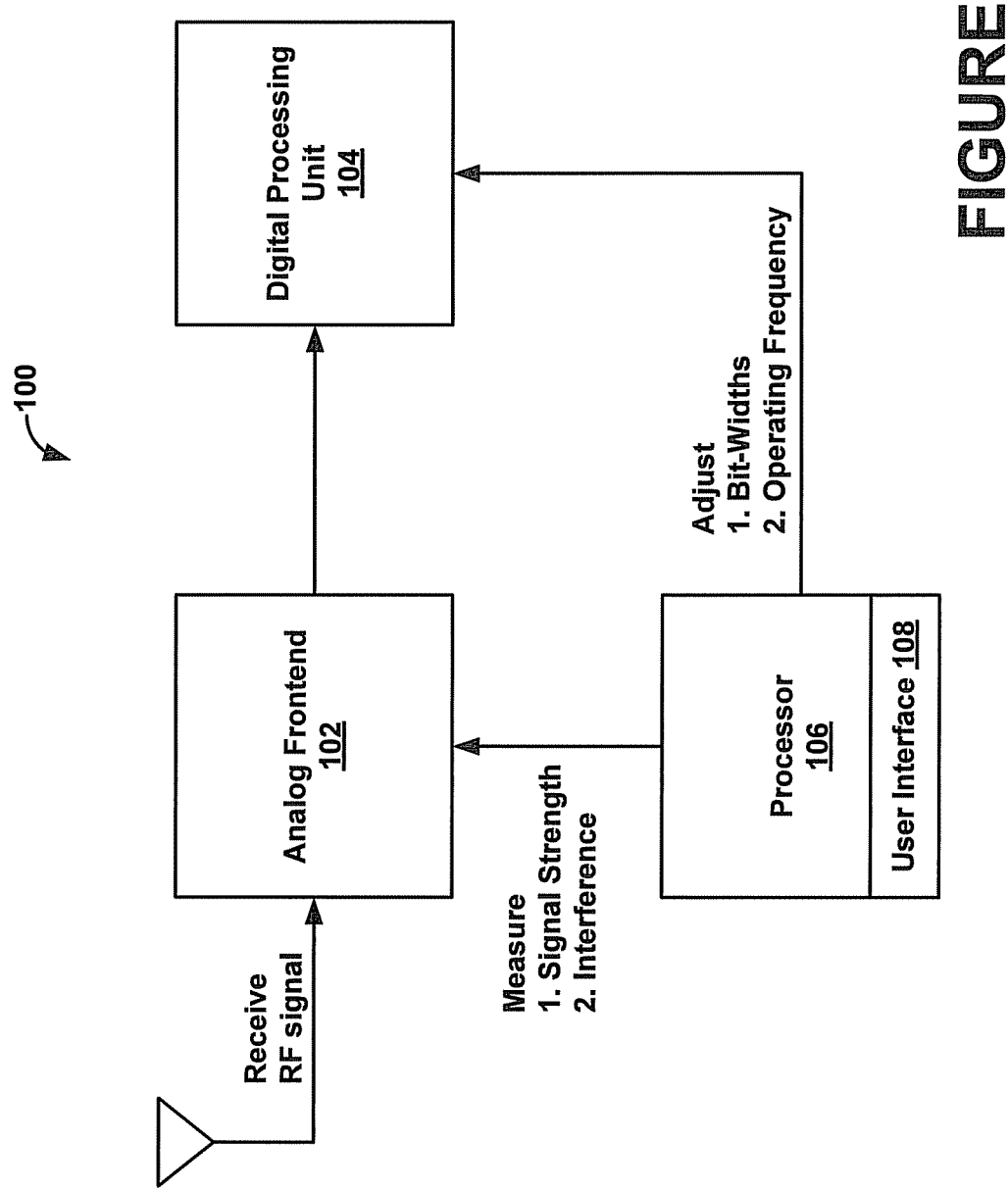
FIG. 1 is a block diagram of an example receiver.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

An embodiment provides an adaptive digital baseband receiver for a low power zero-IF and low-IF receiver to reduce the power consumption, for example. A sampling frequency and bit width are varied to reduce power consumption under favorable signal and interference condition, thus recovering design margins introduced to handle worst case conditions.

Another embodiment includes a communication receiver which includes an analog front-end followed by a digital processing unit. The analog front end amplifies, down-converts and filters an incoming RF signal. A frequency spectrum of the down-converted signal is centered at DC for Zero-IF architecture or at a low frequency in the MHz range for a Low-IF architecture, for example. The analog signal is then digitized by an analog-to-digital converter (ADC) for further processing in the digital domain. Design of the analog front end is largely determined by a worst case weakest RF signal that needs to be handled in the presence of the worst interference possible. This establishes a limit on acceptable noise figures and minimum linearity of the front end. This also determines a dynamic range and hence a resolution of the ADCs. A remainder of digital processing is usually performed at the same resolution, for example. Conversely, under larger input signal and smaller interference conditions, a dynamic range requirement of the ADC is much smaller. However, as mentioned, receiver designs are usually designed to handle the worst case conditions of weakest input signal and largest interference. Consequently, the digital section design may be overdesigned for more benign conditions, and hence waste power. An embodiment of an adaptive digital baseband section is provided where a resolution of the ADC and the bit-widths of the digital section is adjusted to meet a target bit error ratio (BER) for an existing signal and interference conditions, while minimizing power consumption.

Input thermal noise in a receiver front-end as well as quantization noise of the ADC are main noise sources. Oversampling the analog signal at the ADC enables averaging of uncorrelated components of noise in the receiver. Thus, a higher operating frequency for the ADC and the digital section leads to a higher sampling rate, which can be traded off with lower bit-widths to a certain extent, while maintaining the same BER performance. For every input signal, noise, and interference level, there exists a choice of bit-widths and sampling rates that will lead to the same BER performance, but with different power costs. In example embodiments below, optimal bit-widths and operating frequencies for different input conditions are determined to provide operational settings for an adaptive receiver under the different input conditions. Thus, particular receiver architectures presented may be adaptive to changing interference and signal strength conditions, for example.

Further, in example embodiments, interference estimation can be useful in low power receiver design. Mitigating interference in the receiver may include usage of higher order filters, high sampling frequency to avoid aliasing, higher dynamic range of ADC and other analog components, less noisy oscillators to down-convert signals and higher resolution digital section including ADC. Thus, a lot of power may be used in the receiver to cope with interference. In example embodiments, in situations when interference is less, the receiver can adapt itself to less interference situation by tuning itself to save power.

Further, interference estimation may be performed by estimating a variance of a constant envelop modulated signal (e.g., IEEE 802.25.4-2006 uses constant envelop modulation). This method provides an overall interference estimate, but may not give interference in specific frequency bands (interference near desired bands can be more harmful). Interference estimation may also be performed by measuring power spectral density (PSD) after performing a fast Fourier transform (FFT) of the input signal. This method gives spectrum specific interference estimate, and is useful for wideband interference estimation. For receiver design, interference estimates of adjacent and alternate channels may only be needed, and in such a case, using an FFT unit is unnecessary and hence consumes more power than necessary. In example embodiments, interference may be estimated by measuring power in individual interference bands after down-converting a signal to baseband (e.g., a signal at baseband is usually considered to include frequencies from near 0 Hz up to a highest frequency in the signal with significant power) to minimize receiver power consumption by avoiding many processing elements when interference is low, for example.

Some embodiments below concern adaptivity at a lowest layer of receiver design, namely the circuit level. For example, digital baseband's bit-widths and operating frequencies can be adjusted based on both incoming signal and interference levels to minimize power while achieving target BERs. In one example application, the receiver complies with IEEE 802.15.4-2006, known as the Zigbee standard. The receiver may also be designed to comply with other wireless standards such as IEEE 802.11x, 802.16, etc. The Zigbee standard has evolved as a standard for Personal Area Networks (PAN) and sensor networks, and is suited for low power wireless systems. The Zigbee standard supports comparatively lower data rates (250 kbps) for bandwidth per channel (5 MHz) which may make low power implementation more feasible.

Example methods provided herein analyze a BER of a receiver as function of bit-widths and operating frequencies of the ADC and the digital section of the receiver. This can then be used to determine a lowest power solution for a given input signal, noise, and interference level. Such an analysis can require an exhaustive evaluation of receiver performance for different bit-width and operating frequency setting for each input condition. However, estimations of BER perfou ance can be performed by evaluating normalized variances of distances between correlations of received signals with different symbols, which enables a more rapid simulation.

Referring now to the Figures, FIG. 1 illustrates an example receiver 100. The receiver 100 includes an analog frontend 102 that receives a radio frequency (RF) signal and outputs the signal to a digital processing unit 104, which recovers the transmitted signal. A processor 106 is coupled to the analog frontend 102 and the digital processing unit 104, and measures a signal strength of the received RF signal and interference in a wireless channel through which the signal was received, and adjusts bit-width and operating frequency parameters in the digital processing unit 104 to minimize power consumption by the receiver 100. The processing unit 104 may also include (or be connected to) a user interface 108 that allows a user to tune the bit-widths and operating frequency parameters.

For example, a resolution of an analog-to-digital converter (ADC) in the digital processing unit 104 indicates a number of discrete values that the ADC can produce over the range of analog values. The number of discrete values available, or bits, indicates the resolution, and thus, an ADC with a resolution of 8 bits can encode an analog input to one in 256 different levels (e.g., $2^8=256$). Using a lower resolution requires less power consumption due to less computations needed to be performed by the ADC, for example. However, to meet a target BER, a certain resolution is required. Also, since a received analog signal is continuous in time, the analog signal is converted to digital values continuously at a predetermined rate, which is referred to as a sampling rate or sampling frequency of the ADC. A higher sampling frequency consumes more power. However, as with bit-widths, a certain sampling frequency is required to meet the target BER. The processor 106 determines a bit-width and sampling frequency at which to operate the digital processing unit 106 so as to minimize power consumption while still achieving a target BER.

In example embodiments, for a digital receiver, the number of bits used during analog to digital conversion can be adjusted to lower power consumption based on SNR and interference levels. When a signal is digitized, quantization error can occur, but if the signal is strong enough (e.g., low interference levels), some error can be accepted and the signal can be resolved. Thus, the receiver may determine actual conditions, and then adapt operating parameters to levels needed to meet the conditions instead of meeting a worst case scenario so as to save power. A lowest bit-width and sampling frequency combination may be desired that still meets the target BER so as to consume a least amount of power, for example.

Figure 2:
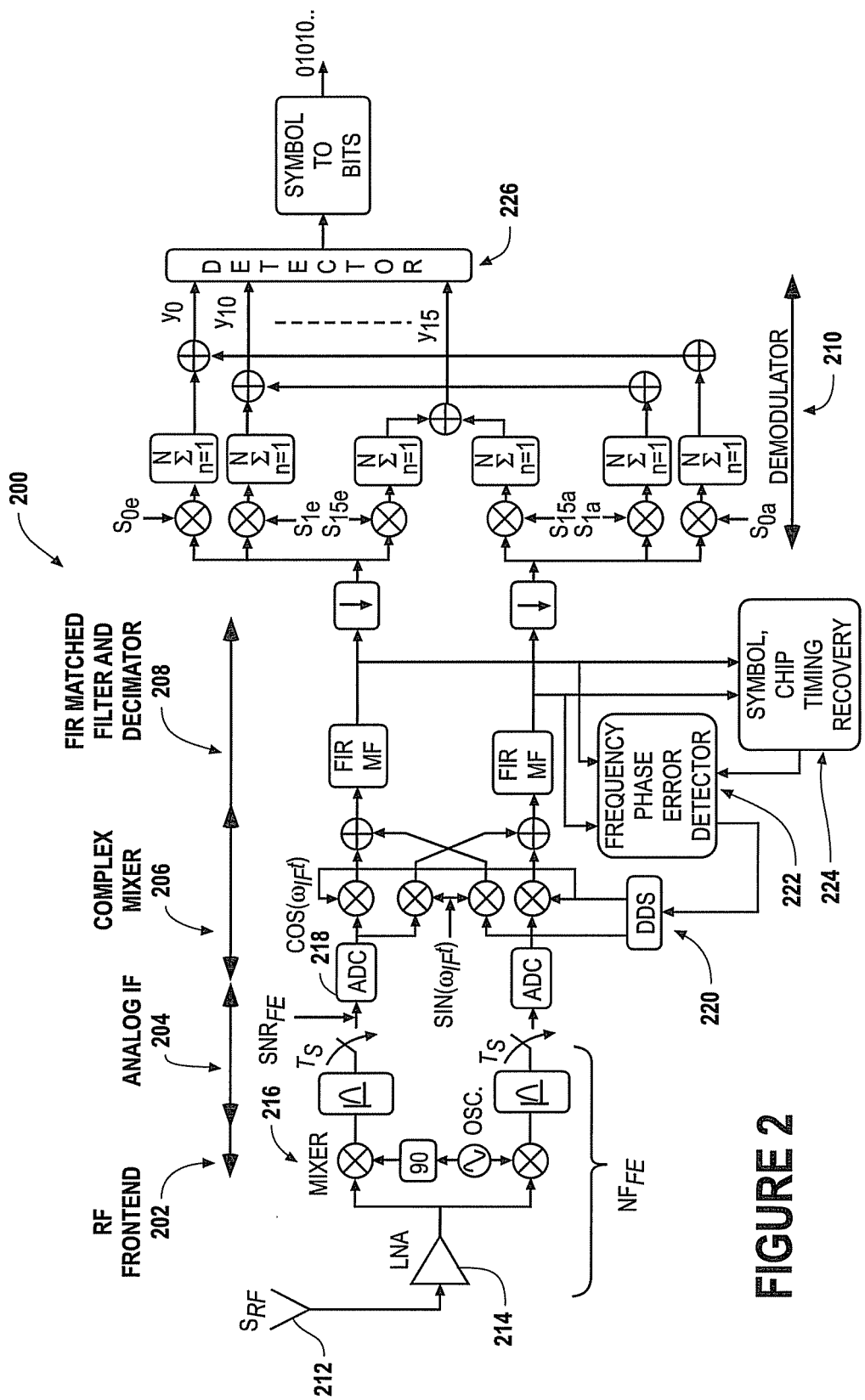
FIG. 2 illustrates components of an example receiver.

FIG. 2 illustrates components of an example receiver 200. The receiver 200 includes a radio frequency (RF) frontend 202, an analog intermediate frequency section 204, a complex mixer 206, a finite impulse response (FIR) matched filter and decimator 208, and a demodulator 210.

The RF frontend 202 includes an antenna 212 that receives a wireless signal that has a signal strength of $S_{RF}$, for example, and outputs to a low noise amplifier (LNA) 214 for amplification. Following, the signal is output to mixers 216. The LNA 214 and mixers 216 introduce a noise figure of the frontend ($NF_{FE}$). The analog IF section 204 receives the signal output from mixers 216 for conversion to a digital signal at analog-to-digital (ADC) converters 218.

A transmitted wireless signal s(t) may be written as:

$$s(t)=x_I(t)\cos(w_{rf}t)+x_Q(t-Tc)\sin(w_{rf}t) \quad (1)$$

The transmitted signal, s(t), may be a 16-ary quasi orthogonally modulated (OQPSK) signal, with wrf as a carrier frequency, and $x_I$ and $x_Q$ are sequences of half sine pulses in In-phase and Quadrature-phase arms. The signal may be transmitted according to the Zigbee standard, which uses an O-QPSK modulation scheme based on 16-ary quasi orthogonal modulation. ZigBee is a specification for a suite of high level communication protocols using small, low-power digital radios based on the IEEE 802.15.4-2003 standard for wireless personal area networks (WPANs).

The bit error ratio (BER) requirement of receiver for the Zigbee standard specifies that the Packet Error Rate (PER) should be less than one percent for a PHY service data unit (PSDU) packet of length 20 octets. The PER requirement translates to BER of $6.25\times10^{-5}$. Generally, a communication system uses a hierarchical frame structure to transmit data of an upper layer. Specifically, a wireless communication standard such as an Institute of Electrical and Electronics Engineers (IEEE) 802.11 standard and an IEEE 802.16 standard uses frame aggregation in a Media Access Control (MAC) layer and a physical (PHY) layer to maximize the efficiency of radio resources. The BER of a wireless communication standard may be determined based on data packet error rates for transmitting and receiving MAC and PHY data packets, for example.

The sine pulses $x_I$ and $x_Q$ are specified as follows:

$$x_I(t) = \sum_m \sum_{n=0}^{15} S_{m,2n}g(t-2nT_c-mT_s) \quad (2)$$

$$x_Q(t) = \sum_m \sum_{n=0}^{15} S_{m,2n+1}g(t-2nT_c-mT_s) \quad (3)$$

$S_{m,n}$ is the $n_{th}$ chip of the $m_{th}$ symbol. $T_c$ and $T_{symb}$ are pulse and symbol duration of 0.5 µs and 16 µs respectively. A half sine pulse, g(t), is given as:

$$g(t)\left\{\sin\left(\pi\frac{t}{2T_C}\right) \quad 0 \le t \le 2T_C, 0 \text{ otherwise}\right. \quad (4)$$

Assuming ideal frequency translations, no I-Q mismatch, and ideal phase recovery, a desired signal at the input of ADCs 118 in the low-IF receiver is:

$$x(t)=[x_I(t)+jx_Q(t-T_c)]\exp^{(-jw_{IF}t)} \quad (5)$$

For a zero-IF receiver, which has the same architecture as the receiver 200 except with no complex mixer 206, the input to ADCs 218 is:

$$x(t)=x_I(t)+jx_Q(t-T_c) \quad (6)$$

The $NF_{FE}$ is a parameter for front-end design. The $NF_{FE}$ sets a limit on a maximum amount of noise and nonlinearity that can be added to the receiver by the frontend. As specified by the Zigbee standard, a receiver shall be capable of achieving a sensitivity of about 85 dBm or better. For 50 Q matching at the input of the LNA 214 and 2 MHz channel bandwidth, a worst case Noise Figure of the frontend can be calculated as:

$$NF_{FE}=-85dBm+173.8-10\log_{10}(NEB)-SNR_{FE}dB \quad (7)$$

$SNR_{RF}$ is the signal-to-noise ratio (SNR) required at input of the ADC 218, and NEB is the noise equivalent bandwidth of a channel select filter. The dependence of NF on $SNR_{RF}$ provides a performance trade-off between the analog frontend 204 and the digital section 208 and 210 of the receiver 200. A higher $SNR_{RF}$ results in a lesser complexity of the digital section, but the NF of the front end should be lower, which increases complexity of the front-end, for example. For the computations shown below, the front end noise is assumed to be Gaussian.

The analog IF 204 outputs to the complex mixer 206, which includes mixers and a direct digital synthesizer (DDS). The complex mixer 206 outputs to the FIR matched filter and decimator 208, which includes a frequency/phase error detector 222 and a symbol/chip timing recovery detector 224. The FIR matched filter 208 outputs to the demodulator 210, which includes a bank of correlators that correlate a sampled and quantized received signal (corrupted by noise and interference) with all sixteen possible symbols. Each symbol includes a sequence 16 chips for the I and Q portions. $S_{mo}$, is an odd numbered pulse sequence of the $m_{th}$ symbol, and $S_{me}$ is an even numbered pulse of $m_{th}$ symbol. Correlation is performed at the symbol level over a symbol period to recovers the transmitted signal.

A detector 226 in the demodulator makes a decision on the transmitted symbol based on which of the correlators gives a largest output. Based on this decision, the received symbol is mapped back to message bits. The clock frequency of the ADC and digital section may be $$f_s\left(\frac{1}{T_s}\right),$$

for example.

To design the receiver 200, an SNR required at the input of the demodulator 210 ($SNR_{demod}$) is determined that provides a certain maximum BER. An error ratio is the ratio of the number of bits, elements, characters, blocks, etc. incorrectly received to the total number of bits, elements, characters, or blocks sent during a specified time interval. One example of an error ratio is the bit error ratio (BER) (or sometimes referred to as bit error rate). Examples of bit error ratio are (a) transmission BER, i.e., the number of erroneous bits received divided by the total number of bits transmitted; and (b) information BER, i.e., the number of erroneous decoded (corrected) bits divided by the total number of decoded (corrected) bits. Generally, the BER is the likelihood of a bit misinterpretation due to electrical noise.

The design of the analog frontend 202 is performed to ensure that $SNR_{FE}$ of the signal output from the analog frontend 203 is close to the $SNR_{demod}$ target, even for the worst case signal and interference conditions. A small SNR margin is given to the ADC and the digital section, and hence the digital section parameters of bit-widths and operating frequency are chosen to ensure that the parameters do not degrade the SNR too much. This can lead to an over-design of the ADC and the digital section. The following Signal-to-Noise Ratio (SNR) calculation illustrates how to determine parameters of the digital portion of the receiver 200.

$$SNR_{de\,mod}^{avail} = \frac{S_{FE}}{N_{tot}} \qquad (8)$$

$$N_{tot} = N_{FE} + N_{ADC} \qquad (9)$$

$SNR_{de\,mod}^{avail}$ is the SNR available at the input of the demodulator 210, $S_{FE}$ and $N_{FE}$ are signal and noise powers at the input of ADC 218. $N_{ADC}$ is the noise/error by the ADC 218 of the receiver 200, and predominantly includes quantization noise/error.

Amplitude resolution (e.g., number of bits) for digital section (e.g., 208 and 210) is avail optimized for conditions: i) $SNR_{de\,mod}^{avail} \geq SN_{demod}$ and ii) $N_{ADC} \ll N_{FE}$. Estimating resolution of the received signal at the receiver 200 can have drawbacks such as errors in estimating quantization noise/error, and errors in $SNR_{demod}$ estimation (e.g., $SNR_{demod}$ is obtained by analysis or simulation of the demodulator and is usually constant and assumed independent of ADC resolution and resolution of signals in the digital section of the receiver, but performance of the demodulator and other signal processing components in digital section of the receiver depends on the resolution of signals fed to them). Other difficulties to overcome include performance of signal processing units, such as the synchronizers 220 that require a certain level of resolution of a signal, quantization on the noise input to ADC is more prominent when the resolution is less, and a condition for optimizing a number of bits may require $N_{ADC}$ smaller than $N_{FE}$. Determining the resolution in this manner can lead to over-designing the ADC because there may be no fixed manner to set relative levels of the noise components. A sufficient margin is assumed to set the relative level, and examples of sufficient margins include 13 dB, 35 dB, or other wide variations dependent on an application of the receiver.

These difficulties in SNR calculations to determine the bit-width (resolution) and operating frequency parameters of the digital section leads to over-designing, which can be a concern while trying to reduce power consumption. In example embodiments, the SNR contribution of the digital section is accurately considered so that the SNR can be minimally designed to reduce overall power consumption. For example, for a given $SNR_{FE}$ at the input of the ADC, the ADC and digital section's bit-widths and operating frequency are chosen so that a target SNR at the input of the demodulator 210 is achieved to sufficiently guarantee a target BER. For example:

$$\{Q\text{dig}, f_s\} = f(SNR_{FE}, SNR_{demod}, \text{interference}) \qquad (10)$$

is determined such that power of the receiver 200 is minimized while meeting a target BER. Here, $Q_{dig}$ is an amplitude quantization of an ADC output and of correlation sequence in the FIR filter. Resolution in time is controlled by controlling the operating frequency ($f_s$) of the digital section. The digital data path including the ADC runs at this operating frequency ($f_s$). Note that for given values of the bit-widths and operating frequency, many different choices exist for the quantization parameters ($Q_{dig}$, $f_s$) that will meet the target BER. However, only some choices may minimize the power dissipation of the digital section. Furthermore, with varying values of $SNR_{FE}$ and interference, optimal choices for the quantization parameters can vary, necessitating an adaptive resolution based digital section, for example. For different levels of the bit-widths and operating frequencies, the design parameters ($Q_{dig}$, $f_s$) of the optimal digital receiver can change.

Simulations can be performed to determine a closed form expression for the function in Equation (10). The simulations can be performed with waveforms at the input of the digital section that accurately capture effects of quantization on BER. For example, simulations are performed to determine the quantization parameters that guarantee a BER for Equation (10). Thus, avail for each input $SNR_{RF}^{avail}$ and interference, an overall BER is evaluated for several different quantization parameter settings.

Figure 3:
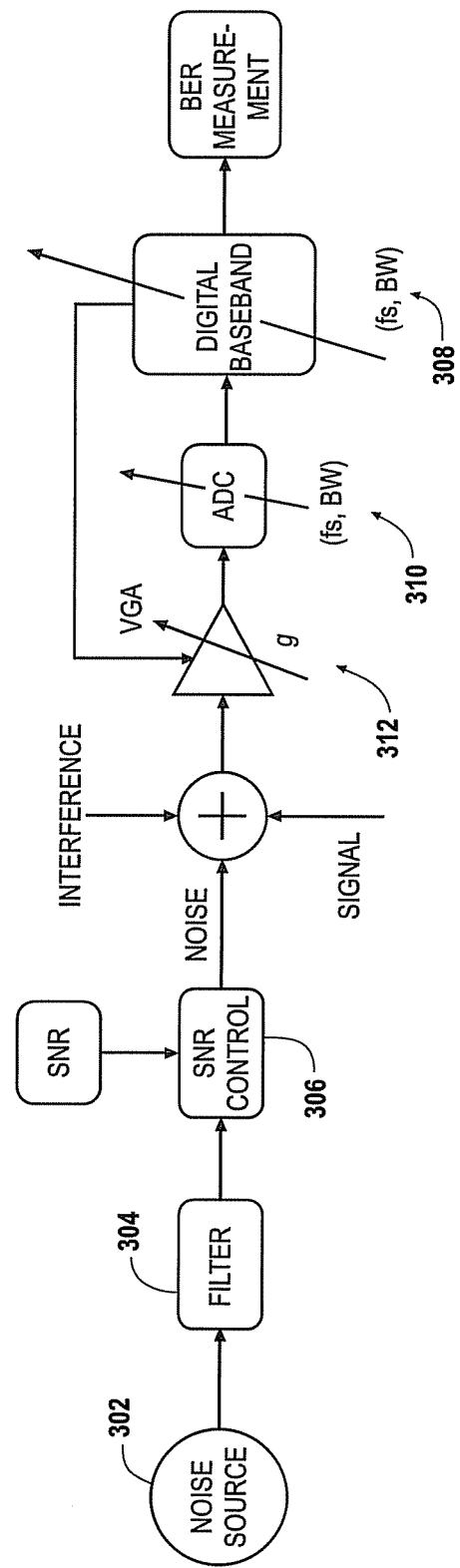
FIG. 3 is an example conceptual simulation model for estimating operating parameters of a receiver.

An example conceptual simulation model is illustrated in FIG. 3. The model includes a noise source 302, including the model signal and interference, which passes through a channel select filter 304. Noise levels are controlled by an SNR control 306 to maintain an $SNR_{FE}$ at the input of an ADC. A peak detector 308 measures a signal amplitude at the input to an ADC 310 and adjusts the gain of variable gain amplifier (VGA) 312 to resize the signal levels to the full scale of the ADC 310. Amplitude and time resolutions of the ADC 310 and digital baseband sections are variable. In the example simulation model, g is a variable gain of the VGA 312, $f_3$ and BW are sampling frequency and bit-width, respectively.

Figure 4:
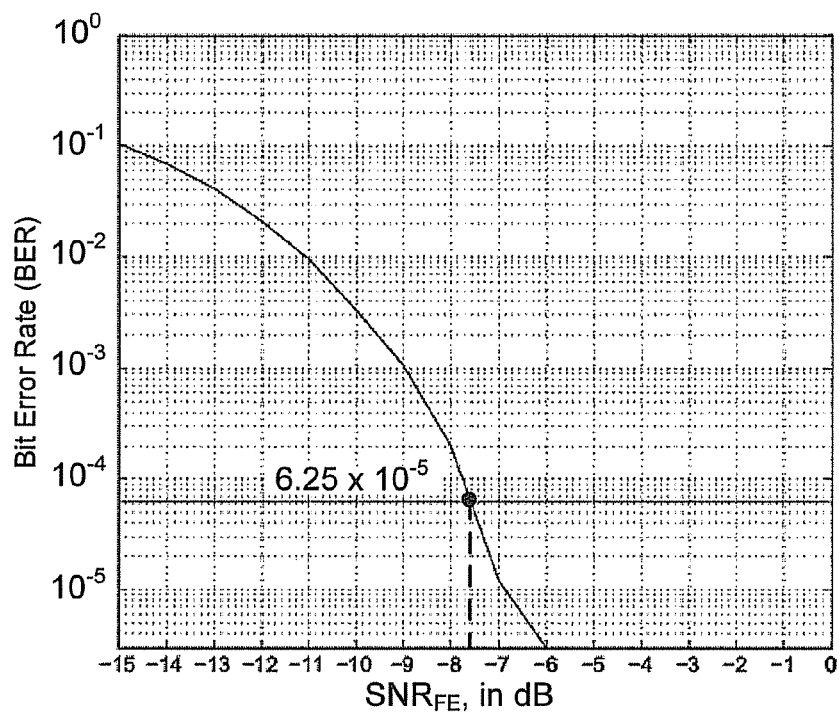
FIG. 4 illustrates an example simulated bit-error-ratio (BER) versus signal-to-noise ratio (SNR) curve for a receiver.

FIG. 4 illustrates an example simulated BER versus $SNR_{FE}$ curve for a low-IF receiver using the simulation model of FIG. 3 in the presence of a second order lowpass filter in the frontend. From the graph in FIG. 4, a minimum $SNR_{FE}$ of −7.6 dB is required for the desired BER of 6.25× $10^{-5}$, for example.

Regarding interference modeling, in the example standard of ZigBee communication, four interfering channels are specified. Channels adjacent to a desired channel transmit at a same power level as the desired channel, for example, at a power level of −82 dBm. However, alternate channels transmit at a power level of −52 dBm, for example. A signal at an input of the receiver is:

$$rec(t) = Re\left\{ \begin{array}{l} x_0 e^{j(2\pi f_c + \theta_0)} + x_1 e^{j(2\pi f_1 t + \theta_1)} + x_2 e^{j(2\pi f_2 t + \theta_2)} + \\ x_3 e^{j(2\pi f_3 t + \theta_3)} + x_4 e^{j(2\pi f_4 t + \theta_4)} \end{array} \right\} \quad (11)$$

Where $x_0$ is a desired signal at carrier frequency $f_c$, $f_1$ and $f_2$ are adjacent carrier frequencies at a distance of −5 MHz and +5 MHz from $f_c$, and $f_3$ and $f_4$ are alternate carrier frequencies at a distance of −10 MHz and +10 MHz from $f_c$. The desired signal, $x_0$, can be further given as:

$$x_0 = x_{0I} + jx_{0Q} \quad (12)$$

For a chosen IF of 3 MHz, an input to the filter 304 before the ADC 310 can be given as:

$$x(t) = \quad (13)$$

$$RE\left\{ \begin{array}{l} x_0 e^{j(2\pi 3 \times 10^6 t + \theta_2)} + x_1 e^{-j(2\pi 2 \times 10^6 t + \theta_1)} + x_2 e^{j(2\pi 8 \times 10^6 t + \theta_2)} + \\ x_3 e^{-j(2\pi 7 \times 10^6 t + \theta_3)} + x_4 e^{j(2\pi 13 \times 10^6 + \theta_4)} \end{array} \right\}$$

Figure 5:
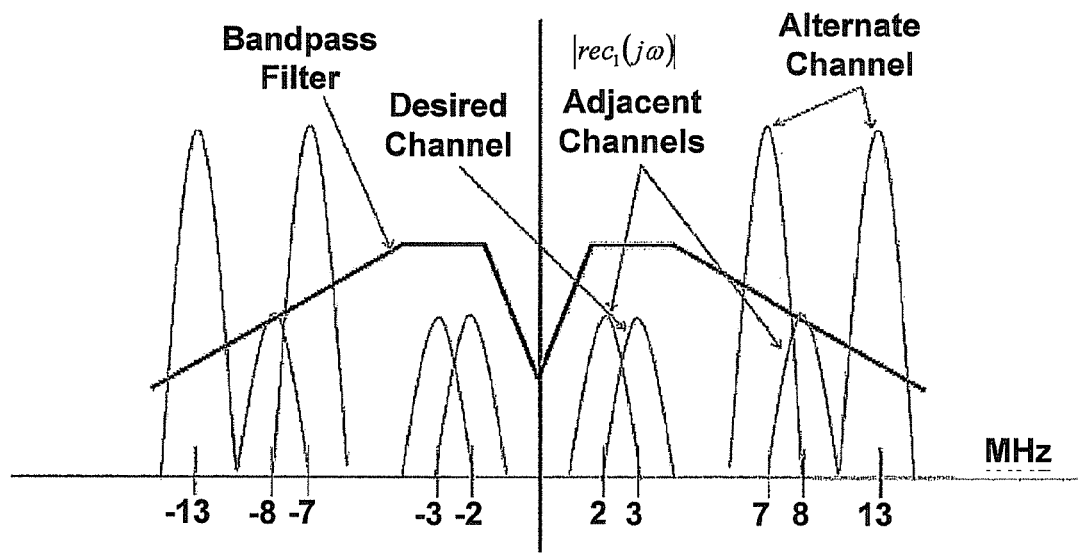
FIG. 5 illustrates an example signal and interference profile for a receiver.

FIG. 5 illustrates an example signal and interference profile at the input of the ADC 310 of a zero-IF receiver, for example. The profile illustrates a desired channel frequency at 3 MHz, and an adjacent channel frequency at 8 MHz, with an alternate channel frequency at 13 MHz.

Figure 6:
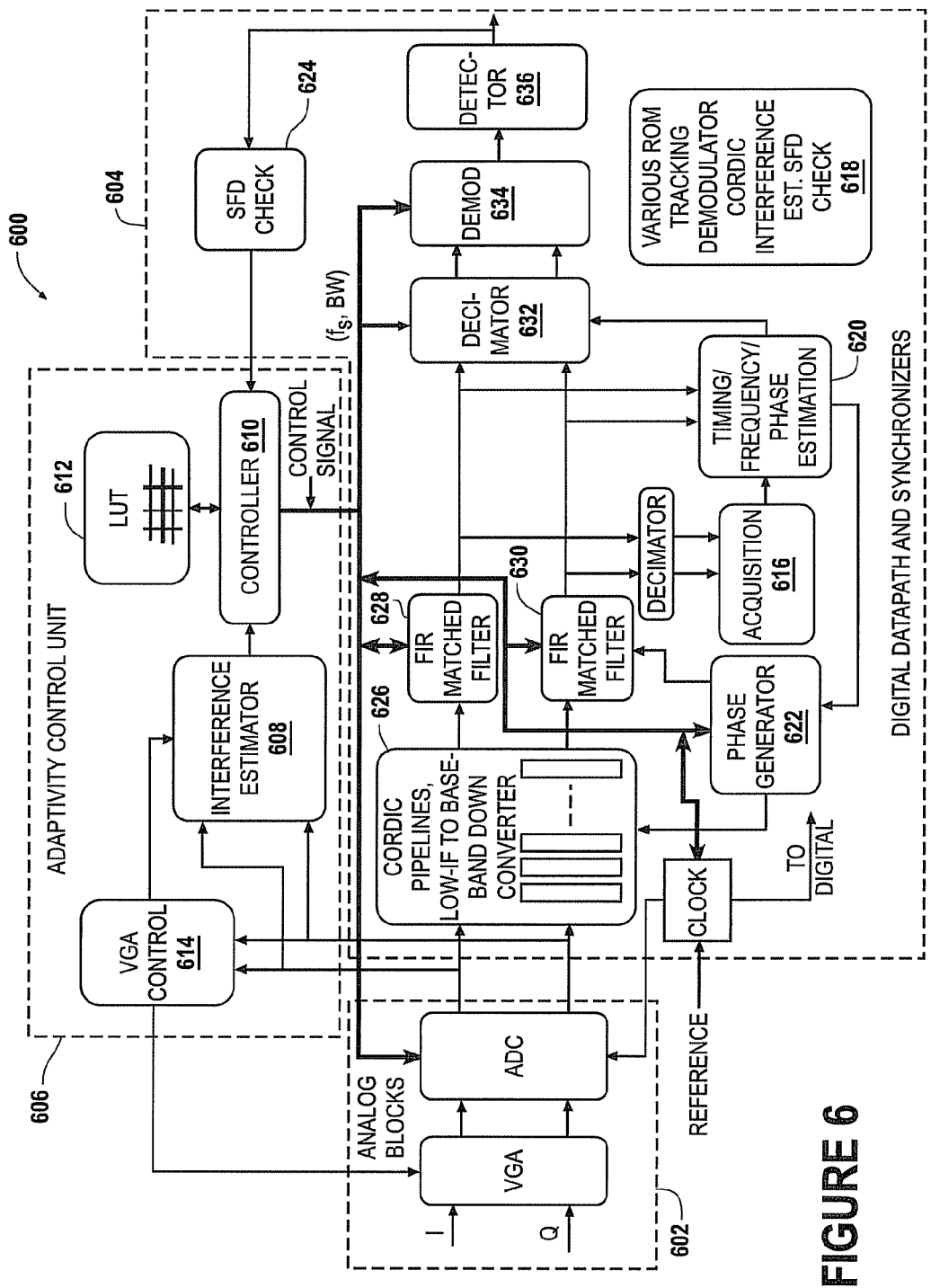
FIG. 6 illustrates an example adaptive receiver.

FIG. 6 illustrates an example adaptive receiver 600 that includes an analog frontend 602, a digital processing unit 604, and an adaptivity control unit 606. Many of the units within the analog frontend 602 and the digital processing unit 604 are the same or similar to components of the receiver 200 of FIG. 2, and will not be discussed here again. For example, synchronization units (acquisition, tracking, phase error estimator, frequency error estimator), complex down-converter, FIR filters, decimator, demodulator, etc. have the same or similar functions as those in the receiver 200. However, the receiver 200 includes additional units that enable the receiver to be more adaptive. As shown in FIG. 6 and as discussed previously, the adaptivity control unit 606 includes an interference and SNR estimator (ISE) 608 and a controller 610 that determines a sampling frequency of the receiver 600. The adaptivity control unit 606 also determines bit-widths of the various sections of the receiver 600, and components of the adaptivity control unit 606 may be combined according to specific receiver designs, for example.

Furthermore, the adaptivity control unit 606 includes a look-up-table (LUT) database 612. Based on inputs from the ISE 608, the controller 610 reads entries of the LUT 612 and determines a sampling frequency and bit-widths of other units. A line connecting the controller 610 and an ADC of the analog frontend 602, and a clock, phase generator, FIR matched filters, decimator and demodulator of the digital processing unit 604 carries a control signal from the controller 610 assigning an operating or sampling frequency ($f_s$) and a bit-width (BW).

Adaptive gain control (AGC) 614 may be provided in the receiver 600 to tune a gain of the VGA in the analog frontend 602 so that a signal at the input of the ADC of the analog frontend 602 spans a full dynamic range of the ADC. AGC 614 may includes a signal strength estimator in digital and a feedback link that assigns a gain g as mentioned earlier to the analog VGA.

The ISE 608 estimates interference in the wireless channels. Variance of an estimate of interference that can be tolerated depends on a level of resolution of entries in the LUT 612, for example. If examples are considered when interference are either present or absent, precise estimation of interference is not necessary and hence more variance in interference estimation can be tolerated, for example. From FIG. 5, it can be seen that proximity of the adjacent channel to the desired channel makes the adjacent channel more harmful to the signal than the alternate channels, for example. However, signal power in both the adjacent and alternate channels can vary. Estimation of interference power in individual channels can be helpful, for example. It can be seen from FIG. 5 that for a low-IF receiver, a lower adjacent channel is close to the desired signal channel. In this case, lower adjacent channel interference may be more harmful to the desired signal than an upper adjacent channel interference.

Power in adjacent, alternate, and desired signal bands are estimated non-coherently. $P_{adj}$ is a total power in the adjacent channels, $P_{alt}$ is a total power in alternate channels, and $P_{sig}$ is a power in the desired signal's channel. For an interference power measurement, interference from each interfering channel is down-converted to a baseband signal and filtered by a matched filter.

Figure 7:
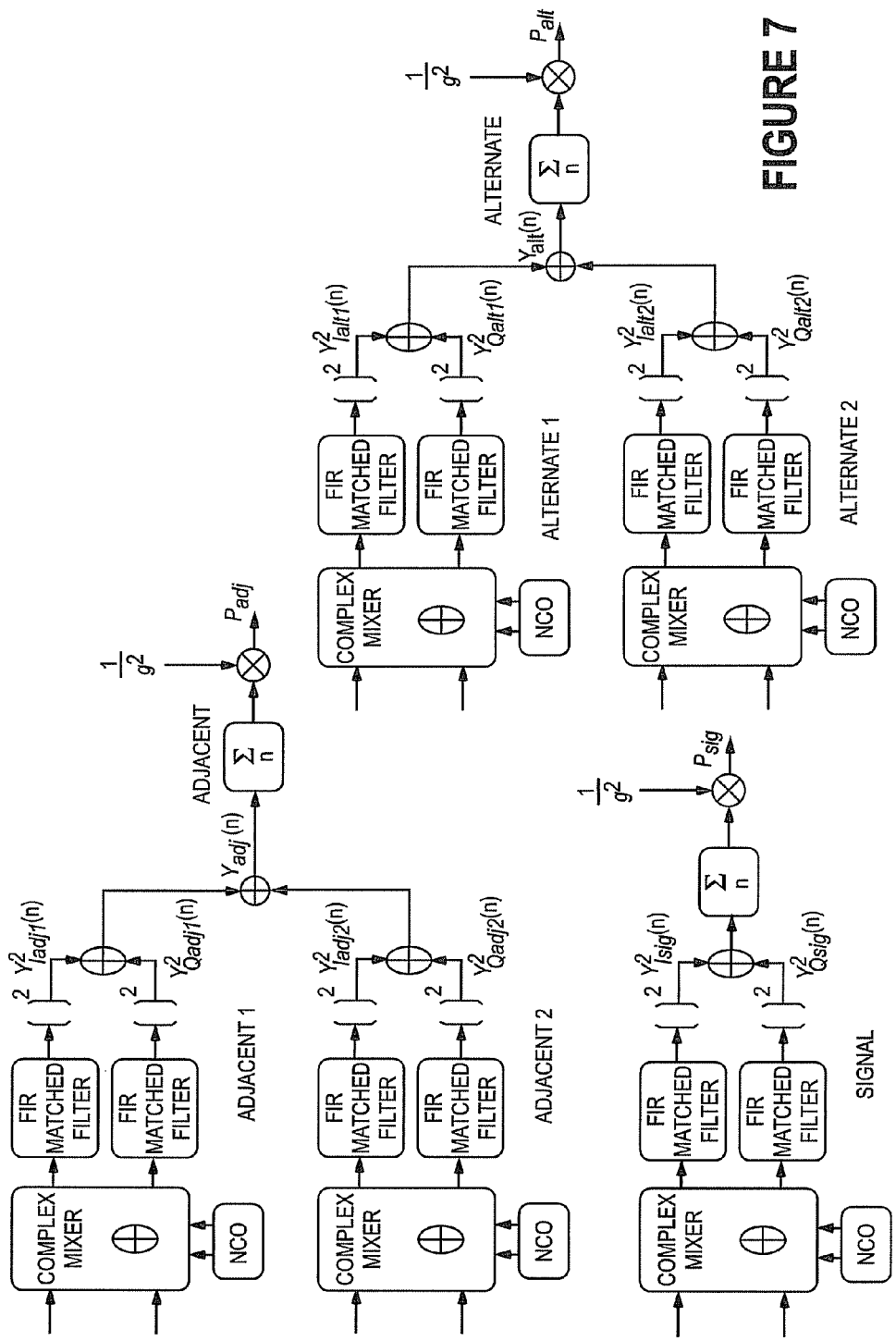
FIG. 7 illustrates an example interference and signal strength estimator.

FIG. 7 illustrates an example ISE, which includes multiple mixer and filter arrangements to estimate power in the wireless channels. As shown, $Y_{Iadj1}$ and $Y_{Iadj2}$ are Ith components of matched filters of adjacent channels. $Y_{Qadj1}$ and $Y_{Qadj2}$ are Qth components of the outputs of matched filters of the adjacent channels. These terms are defined for alternate channels too. If g is a gain of a VGA of the receiver, then the total power in the adjacent channels is:

$$P'_{adj} = \frac{1}{g^2} \sum_n^N Y_{adj}(n) \quad (14)$$

where, $$Y_{adj}(n) = Y_{Iadj1}^2(n) + Y_{Qadj1}^2(n) + Y_{Iadj2}^2(n) + Y_{Qadj2}^2(n) \quad (15)$$

Similarly, estimated power in alternate channels is given by:

$$P'_{alt} = \frac{1}{g^2} \sum_n^N Y_{alt}(n) \quad (16)$$

where, $$Y_{alt}(n) = Y_{Ialt1}^2(n) + Y_{Qalt1}^2(n) + Y_{Ialt2}^2(n) + Y_{Qalt2}^2(n) \quad (17)$$

Still further, estimated power in the desired signal channel is given by:

$$P_{sig} = \frac{1}{g^2} \sum_n^N Y_{sig}(n) \quad (18)$$

where, $$Y_{sig}(n) = Y_{Isig}^2(n) + Y^2 Q_{sig}(n) \quad (19)$$

From equation 20, estimated power of adjacent channels can be given as:

$$P_{adj} = P'_{adj} - 2a^2 P_{sig} \quad (20)$$

where:

$$a = G(f)|_{5\,MHz} \quad (21)$$

G(f) is the fourier transform of g(t), which is given by Eq.4. Similarly, estimated power of alternate channel can be given as:

$$P_{alt} = P'_{alt} - 2b^2 P_{sig} \quad (22)$$

where:

$$b = G(f)|_{10\,MHz} \quad (23)$$

Figure 8:
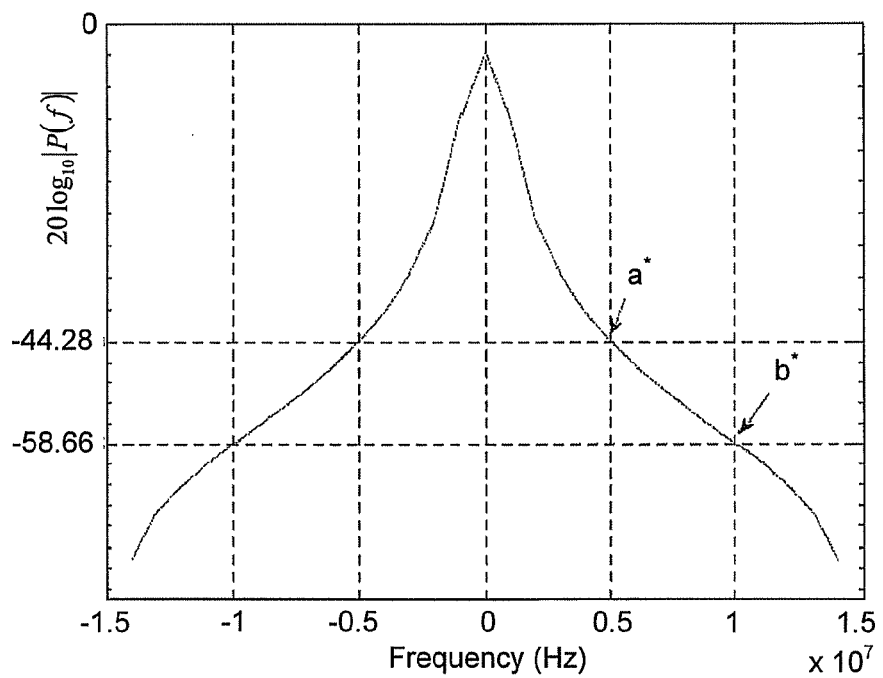
FIG. 8 illustrates an example matched filter's frequency response.

In example embodiments, interference and SNR estimation is completed during a preamble, which is indicated by a sequence of a first symbol followed by two start-of-frame delimiter symbols. For an interference power measurement, interference from each interfering channel is down-converted to a baseband signal and filtered by a matched filter as shown in FIG. 7. An example matched filter's frequency response is shown in the graph of FIG. 8. The graph illustrates that the attenuation at 5 MHz distance is approximately 45 dB, and attenuation at 10 MHz is approximately 59 dB. When estimating the desired signal power, adjacent signal levels fall to −127 dB and alternate signal levels fall to −109 dB, due to attenuation by the matched filter. These levels of interference are low and may not disturb the desired signal power estimation. However, while estimating interference power, signal power from a desired band can affect the interference power estimation. This is due to the fact that a maximum possible signal power is −20 dBm, and even after attenuation by the matched filter, the signal power strength is high enough to affect the interference power estimation. So, while estimating the signal power, adjacent and alternate signals may be neglected, for example.

The ISE 608 also estimates an SNR of a desired signal. A frontend of the receiver 600 is designed for a constant noise figure. The noise figure is calculated for two conditions including a minimum signal strength at an input of the receiver 600, and to meet an SNR at the output of the frontend. The noise figure fixes an upper limit on an amount of noise added by the frontend based on these two conditions. Thus, variance of noise ($\sigma^2$) contributed by the frontend is known. If Equations (2) and (3) are the inputs of the ISE 608, then:

$$P_{sig} = \frac{1}{g^2} \sum_n^N g^2 (x[n] + w[n])^2 \quad (24)$$

For an uncorrelated signal and noise, E(s n)=0, $$\Rightarrow P_{sig} = \sum_n^N (x^2[n] + w^2[n]) \quad (25)$$

$$\Rightarrow \frac{P_{sig}}{\sum_n^N w^2[n]} = \frac{\sum_n^N x^2[n]}{\sum_n^N w^2[n]} + 1 \quad (26)$$

From the above, the SNR is given by:

$$SNR = \frac{\sum_n^N x^2[n]}{\sum_n^N w^2[n]} = \frac{P_{sig}}{N\sigma^2} - 1 \quad (27)$$

Thus to measure $P_{sig}$, Equations 18 and 19 are used, and Equation 27 gives the estimate of SNR.

Figure 9:
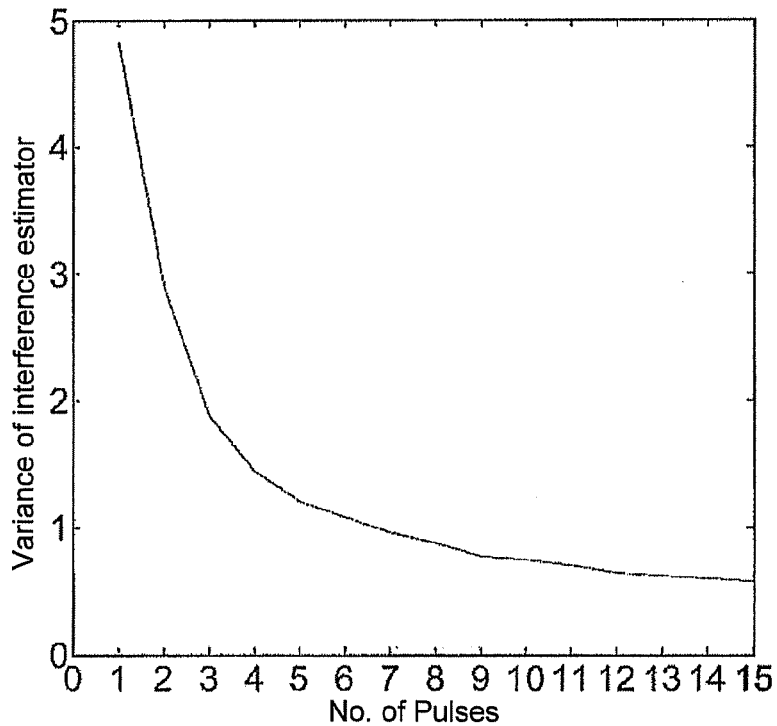
FIG. 9 illustrates an example variance of an interference and SNR estimate as a function of a number of half sine pulses over which the interference and SNR is estimated.

FIG. 9 illustrates a variance of the interference and SNR estimate as a function of a number of half sine pulses over which the interference and SNR is estimated. In this example, the interference and SNR was estimated over four pulses. From FIG. 9, it can be seen that variance of the estimate nearly stabilizes beyond four pulses. The tolerance of the variance of the estimate depends on the closeness of the entries in the LUT 612. If the entries in the LUT 612 are widely spaced, larger variances of estimation can be tolerated.

Referring again to FIG. 6, the digital processing unit 604 receives signals from the controller 610, based on estimates of the interference and SNR, and processes the signal accordingly. The digital processing unit 604 includes components for synchronization or course timing estimation of the received signal. For example, the digital processing unit 604 includes an acquisition unit 616, a frequency error estimator and tracking unit 620, a phase error estimator 622, and a start-of-frame delimiter (SFD) 624. In addition, the digital processing unit 604 may include read only memory (ROM) 618 to help perform many of these functions, for example.

The digital processing unit 604 synchronization functions help to retrieve information from received signals. The synchronization functions include coarse timing (acquisition), fine timing (tracking), frequency error estimation and phase error estimation. Timing synchronization (e.g., acquisition and tracking) helps to indicate where and when a symbol begins within a received data packet, for example. Frequency and phase synchronization help to down-convert a baseband signal from the received RF signal, for example.

Figure 10:
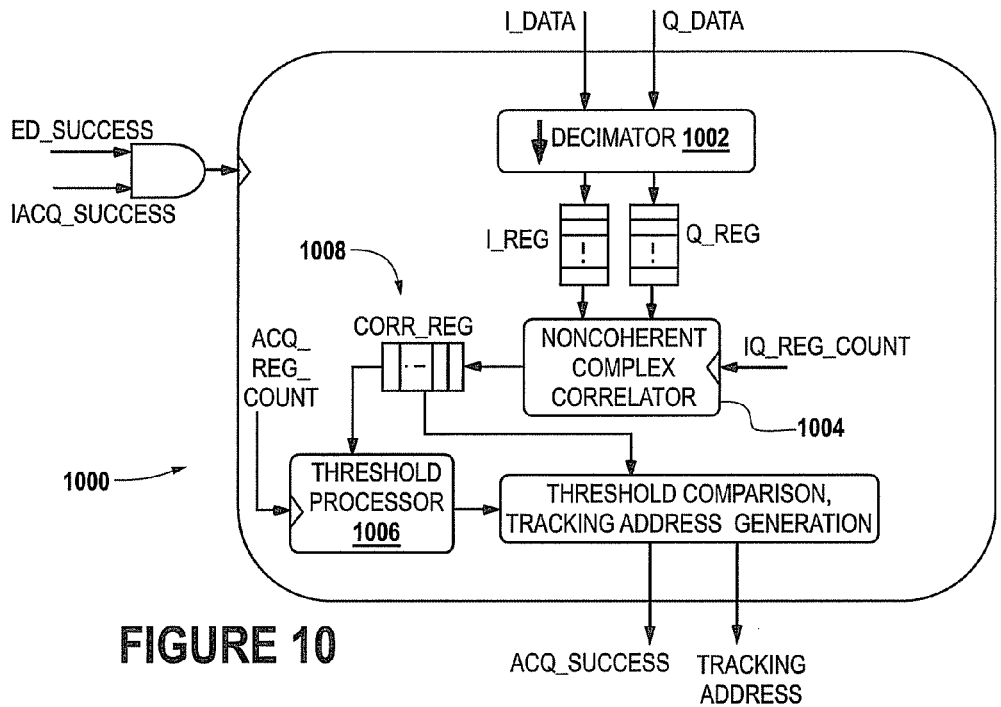
FIG. 10 illustrates an example acquisition unit of a receiver.

An example illustration of an acquisition unit 1000 is shown in FIG. 10. An input to acquisition unit 1000 may be decimated to 2 MHz by a decimator 1002 to reduce the number of samples, and as shown in FIG. 10, the unit 1000 computes a complex correlation of the input samples using complex non-coherent correlators 1004. Outputs of the complex non-coherent correlators 1004 are stored and further used by a threshold processor 1006 to further calculate thresholds for detection. The threshold processor 1006 supports an adaptive feature of the receiver by providing different acquisition thresholds for different sampling frequencies and quantization. When a correlator output exceeds the threshold, for example, an address for a next tracking unit is generated to be used for further fine timing synchronization.

The acquisition unit 1000 operates to perform coarse timing estimation of a signal to indicate a location in a data packet where a symbol begins, for example. A signal received by the receiver includes concatenated symbols. A tracking unit further refines the timing information given by the acquisition unit 100 to output a correct address, for example.

As shown in FIG. 10, decimated samples are stored in registers I_reg and Q_reg 1008 until samples of one symbol are not stored. Each register has 32 delay elements, for example. Once the registers 1008 are full, noncoherent correlation begins. Outputs of the correlators 1004 are stored in the register corr_reg. The register stores 8 correlation values, for example. Once the register is full, the threshold processor 1006 begins processing. When a correlation value exceeds the threshold, acq_success goes high and a coarse address (track_add) is given to the tracking unit 620 to start fine timing synchronization.

The synchronization sequence may be performed, for example, according to the following steps shown below in Table 1.

TABLE 1

```
if (ED_success == 1) then
        if (acq_success == 0) then
                Acquisition ON
        else
                Acquisition OFF
        end if
        if (acq_success == 1 and tracksuccess == 0) then
                Tracking ON
        else
                Tracking OFF
        end if
        if (track_success == 1 and FEE_done == 0) then
                Frequency Error Estimation (FEE) ON
        else
                FEE OFF
        end if
        if (FEE_done == 1 and PEE_done = = 0) then
                Phase Error Estimation (PEE) ON
        else
                PEE OFF
        end if
        if (PEE_done == 1 and SFD_done == 0) then
            Start Demodulation
            Do SFD_check
        else
            if (PEE_done = = 1 and SFD_done == 1) then
                Keep Demodulating
            end if
        end if
    end if
```

Figure 11:
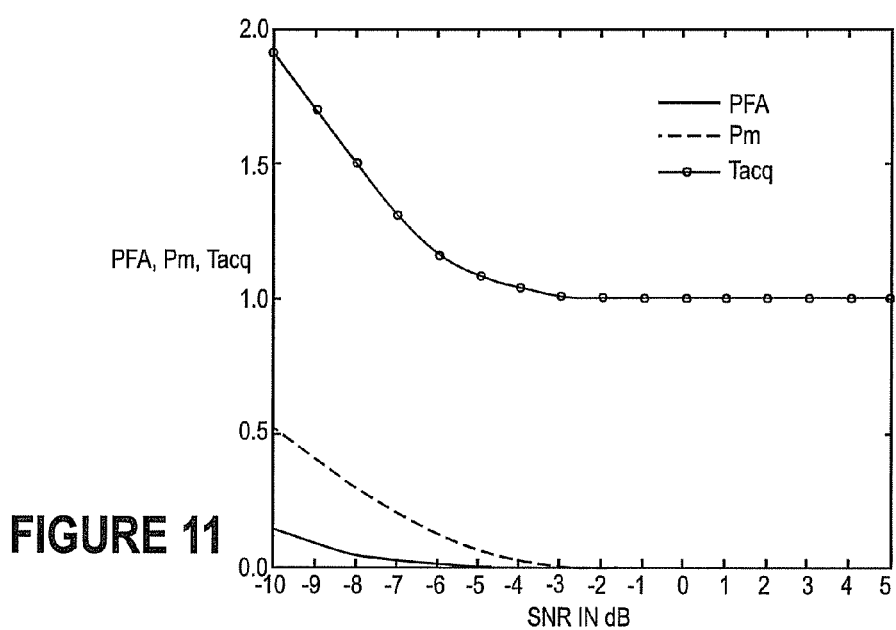
FIG. 11 is a graph illustrating an example simulation of the acquisition unit of FIG. 10.

FIG. 11 is a graph illustrating an example simulation of the acquisition unit 100. A probability of false alarm (PFA), probability of miss ($P_m$) and acquisition time ($T_{acq}$) is shown as a function of SNR at the input of the ADC. A false alarm indicates when a signal (e.g., symbol) has not arrived but the synchronization units indicate receipt of a signal. A miss is a situation when a signal (e.g., symbol) has arrived but the synchronization units could not detect the signal. An acquisition unit may not fully detect all symbols or erroneously indicate that signal/symbols have been received. An average time to declare an arrival of a signal/symbol is the acquisition time.

Figure 12:
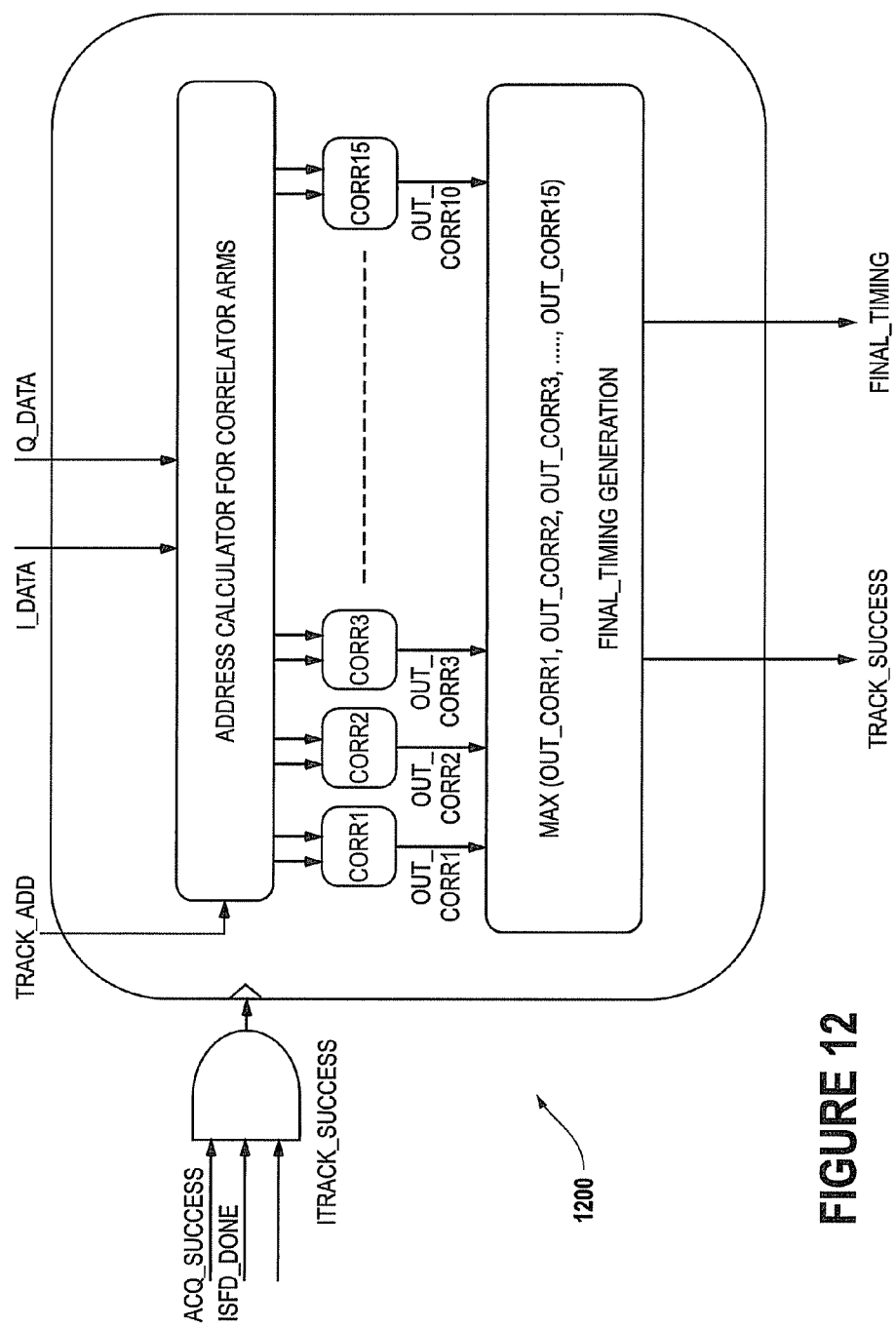
FIG. 12 illustrates an example tracking unit for fine timing synchronization of a received signal.

FIG. 12 illustrates an example tracking unit 1200 for fine timing synchronization of the received signal. The tracking unit 1200 may be a substitute for a conventional Delay Lock Loop (DLL) and consumes less power. The tracking unit 1200 further refines timing of the signal to indicate substantially exact instances from where a signal begins, for example, using information from the acquisition unit.

The tracking unit 1200 is a feed-forward structure and requires less multipliers than a conventional DLL as correlation does not need to be re-computed at every iteration, for example. Also, the tracking unit 1200 does not need memory because the tracking unit 1200 computes non-coherent correlation as the samples of the signal arrive. Thus, the tracking unit 1200 considers a symbol duration to estimate fine timing of the received signal. The tracking unit 1200 begins processing on the address obtained from the acquisition unit, e.g., track_add. The tracking unit 1200 includes 15 correlator branches, for example, and each branch performs correlation over one symbol. A first begins starts correlation from track_add, a second branch beings correlation from track_add+1, a third branch begins correlation from track_add+2, and so on. Finally, fine timing is obtained by determining a maximum of all the correlation values over one symbol, for example. Each correlator may include 4 multipliers, 2 adders, 2 squarers and one accumulator, for example.

A signal input to the demodulator of the digital processing unit 604 of the receiver 600 should be a baseband signal with no carrier frequency present. However, due to mismatch in down-converters across the receiver chain, a residual carrier frequency might be present that affects performance of the demodulator and other units of the digital receiver. The frequency error estimator 620 estimates a residual frequency error using CORDIC to convert the Cartesian, for example. The frequency error estimator 620 mixes two complex conjugate exponential signals delayed by a sample interval. A phase of the complex signal after mixing is a difference in phase of two subsequent samples of a frequency error component. The difference in phase is the frequency error in radians and is averaged over a symbol to allow for the phase to be determined by the CORDIC, for example. The frequency error estimator 620 outputs to the phase error estimator 622, which may be a first order digital phase lock (PLL), for example. The phase error estimator 622 may receive one symbol and estimate the phase error.

The start-of-frame delimiter (SFD) 624 confirms the synchronization of the acquisition unit 616, the tracking unit and frequency error estimator 620, and the phase error estimator 622, for example. The SFD 624 searches for SFD symbols after the phase error estimation is completed and once the SFD symbols are found, an SFD_complete signal is raised. Following an SFD_complete signal, the receiver 600 continues downloading data, and synchronization is complete.

As discussed above, an output of the ADC of the analog frontend 602 is received by the digital processing unit 604 at a baseband downconverter 626. The baseband downconverter 626 may include coordinate rotation digital computers (CORDIC) in rotating mode for a numerically controlled oscillator (NCO), which down-converts incoming low-IF signals to baseband, for example.

Figure 13:
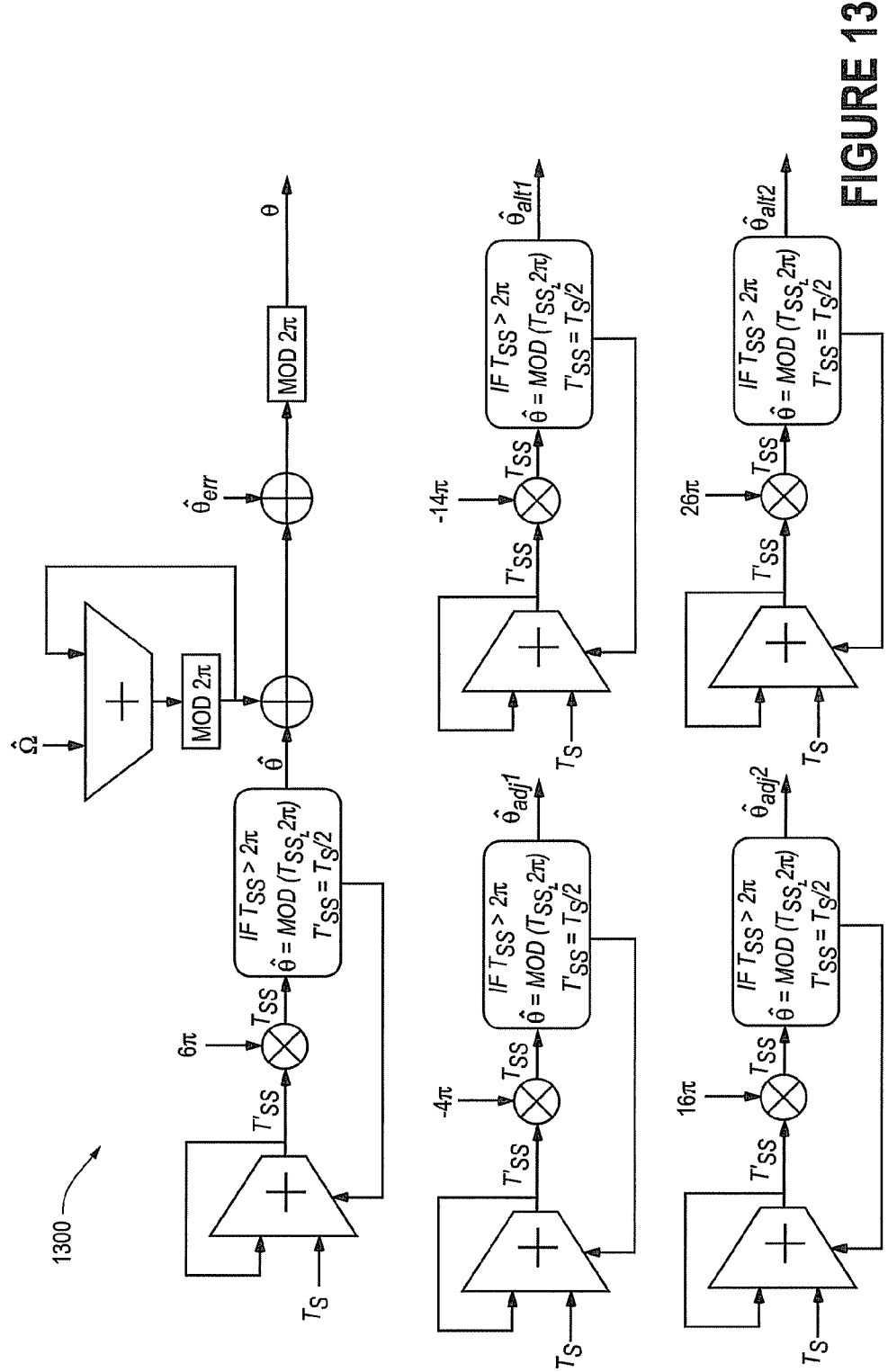
FIG. 13 illustrates an example variable phase generator for a receiver.

FIG. 13 illustrates a variable phase generator for various CORDIC/NCO units (e.g., such as the phase generator 622). An input to the variable phase generator is sampling frequency. FIG. 13 shows phases for adjacent and alternate channels, for example. The hase generator at the top in FIG. 13 shows phase generation for the desired signal, and accounts for frequency error estimate ($\hat{\Omega}$) and phase error estimates ($\hat{\theta}_{err}$).

The CORDIC unit 626 outputs to FIR matched filters 628 and 630. A frequency response of the FIR matched filters 628 and 630 is a function of the sampling frequency. A structure of the FIR matched filters 628 and 630 may vary with the sampling frequency to maintain the same frequency response, for example. This can be achieved by varying a number of taps in the FIR filter.

Figure 14:
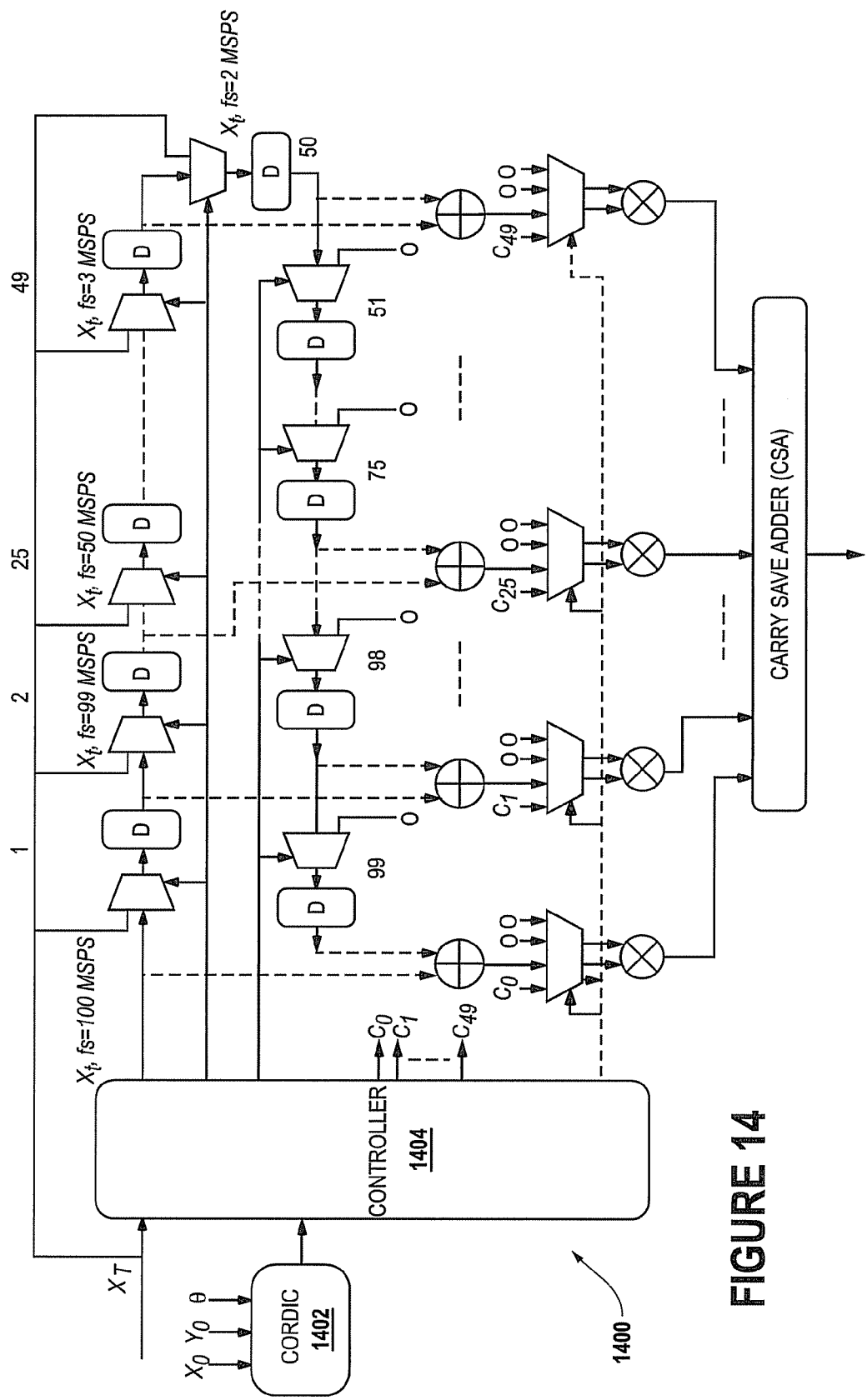
FIG. 14 illustrates an example finite-impulse-response (FIR) matched filter.

FIG. 14 illustrates an example FIR matched filter 1400. As shown, the FIR matched filter 1400 has a CORDIC unit 1402, a central controller 1404, and 50 taps, for example. The CORDIC unit 1402 generates FIR coefficients that are input to multipliers. For each tap, the controller 1404 controls the input to the multiplier. Each tap includes a flop, an adder, a multiplexer and a multiplier, for example. Varying sampling frequency and bit-width parameters are input to the CORDIC unit 1402 and the central controller 1404 depending on interference and SNR conditions. The CORDIC unit 1402 generates coefficients based on the sampling frequency and the controller 1404 controls the bit-widths of the input and filter coefficients. Generating FIR coefficients with the CORDIC unit 1402 enables a more adaptive architecture, and controls the input to the multiplier of the filter depending on the sampling frequency. For example, a tap can be effectively bypassed depending on the sampling frequency by giving zeros to the input of the multiplier through a multiplexer, as shown in FIG. 14.

Remaining units in the digital processing unit 604 of the receiver 600 in FIG. 6 include a decimator 632, a demodulator 634, and a detector 636. The decimator 632 receives signals from the FIR matched filters 628 and 630 and decimates incoming samples depending on the sampling frequency. The decimator 632 leaves one sample per pulse at the output for any sampling frequency. Timing synchronization ensures the sample is the one at the center of the pulse, for example.

The demodulator 634 is a 16-ary quasi orthogonal correlation demodulator, for example, and correlates samples received from the decimator 632 with stored modulation symbols. An output of the demodulator 634 is 16 correlation values. The detector 636 receives the 16 correlation values from the demodulator 634 and determines a maximum of the correlation values. The maximum of the correlation values is declared as the transmitted symbol.

Figure 15:
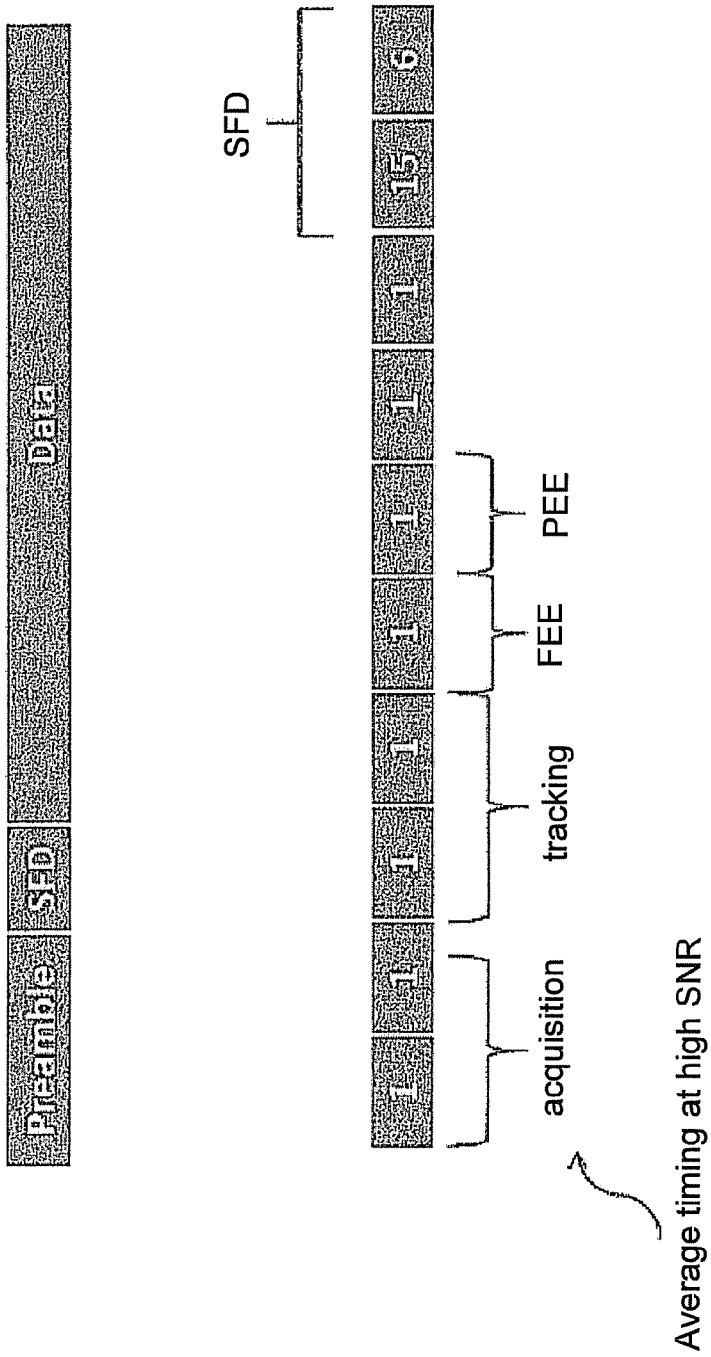
FIG. 15 illustrates an example preamble data packet structure.

In example embodiments, the receiver 600 performs interference and SNR estimation during a preamble, which is a sequence of a first symbol followed by two SFD symbols. An example preamble data packet structure is shown in FIG. 15. FIG. 15 illustrates the data packet structure and an average time to perform various synchronization steps during the preamble when the SNR is high.

Once synchronization is completed and an SFD_done signal flag is raised, all synchronization blocks turn off. Based on the interference and SNR estimates, the controller 610 of receiver 600 in FIG. 6 accesses the LUT 612 for a bit-width and sampling frequency to be used. The data-path (NCO 626, FIR matched filters 628 and 630, decimator 632, demodulator 634, and detector 636) continue operating at the assigned bit-width and sampling frequency from the controller 612.

Example simulations were performed by the receiver implemented in Verilog machine language and then synthesized using a Synopsys®Design Compiler. The UMC 0.13 μm Faraday CMOS standard cell library was used for synthesis and power estimation. The synthesized netlist was used for power estimation. Power estimation is done using a Synopsys® Power Compiler. Power is estimated for various resolution receivers at 100 MHz power, and at other frequencies by scaling the power linearly with frequency. Using this setup, leakage power is negligible and hence was not considered. As an example, an 8-bit receiver consumes much more power than 1-bit largely because of large multipliers in the correlator branches.

FIG. 16 illustrates a table with results of the simulation that show example sampling frequencies for different interference and SNR values for a low-IF receiver. The bit-width and sampling frequency that consumes the lowest power is fed into the receiver components.

For combinations without outputs represented by an asterisk (*), no sampling frequencies were found for the particular combination of an SNR and bit-width that would meet the requirements. The ISE 608 estimates SNR and interference. After determining these two values, combinations of bit-width and sampling frequencies that can be used for achieving a target BER can be found. The combination that consumes a least amount of power is one that is used by the receiver.

In the table of FIG. 16, there are four cases of interference, which include Case I—no interference, Case II—All interference present is at levels defined by the standard, Case III—no adjacent channel interference, and Case IV—no alternate channel interference. There can be multiple levels of interference present, not just the above mentioned four cases. However, each of these possibilities provides a wide range of occurrences in which to perform simulations.

In the table of FIG. 16, when SNR is −7 dB and there is no interference, there are four possible combinations of bit-width and sampling frequency that can be used to meet the target BER of $6.25 \times 10^{-5}$ for Zigbee. For example, 2 bits at 40 MHz, 4 bits at 35 MHz and 8 bits at 28 MHz. Among these combinations, the one that consumes a least amount of power can be selected as the combination to which the receiver will adapt after receiving the preamble. Among all the combinations of bit-width and sampling frequency for a particular SNR and interference, the combination that consumes a least amount of power is fed into the look up table (e.g., LUT 612 in FIG. 6). Additional simulations can be performed for each combination to determine power consumption by the receiver. Alternatively, each combination may be used by the receiver in an iterative fashion, and power measurements can be computed/taken to identify the combination for which the receiver consumes the least amount of power, for example.

To create the table in FIG. 16, simulations for various settings of the receiver for various interference and SNR conditions are performed. Settings that meet BER criteria for a particular condition are noted. Among the noted settings, those that consume a least amount of power are identified and used for the power setting for a particular interference and SNR condition in table, for example.

In another embodiment, the receiver may include (or be connected to) a user interface that allows a user to tune the bit-widths and operating frequency parameters. In this manner, however, the user may not always select parameters that allow the receiver to operate using minimal power.

Figure 17:
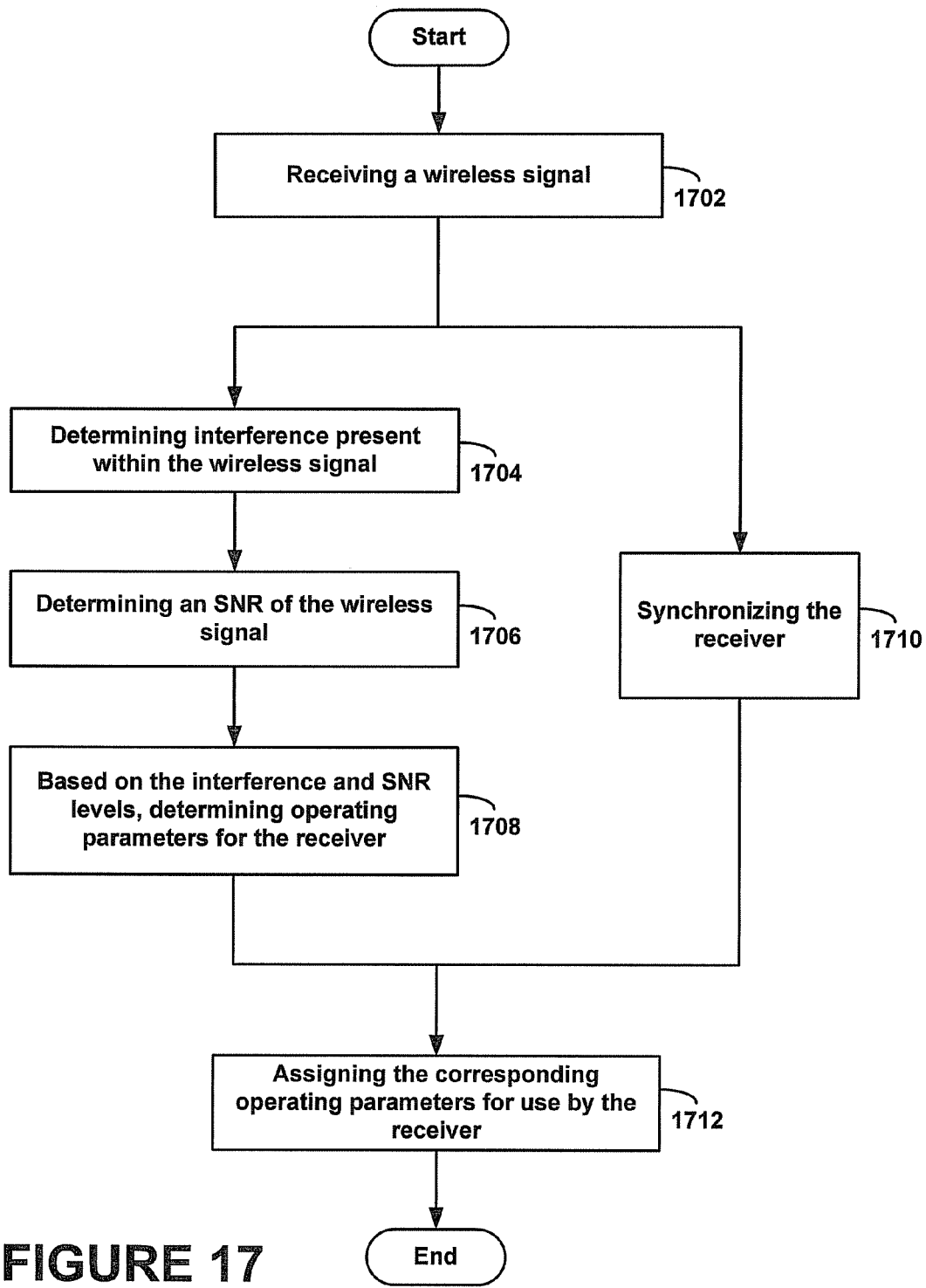
FIG. 17 illustrates an example flowchart including functional steps for adjusting operating parameters of a receiver.

FIG. 17 illustrates an example flowchart including functional steps 700 for adjusting operating parameters of a receiver. It should be understood that the flowchart shows the functionality and operation of one possible implementation of example embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

Initially, a signal is received at a receiver, as shown at block 1702. Following, interference and synchronization processes are performed in parallel. For example, interference in the signal is determined, as shown at block 1704, such as for example, by computing power of adjacent, alternate, desired channels as shown above using Equations (18)-(23). Alternate methods for determining interference in the signal are also available, and may depend upon a wireless communication protocol used to transmit and receive the signal. For example, for Zigbee wireless communications, the Zigbee standard (e.g., IEEE 802.15.4-2006) specifies four interfering channels (e.g., two adjacent channels and two alternate channels).

Next, an SNR of the signal can be estimated and determined according to Equation (27), for example, as shown at block 1706. Based on the determined interference and SNR levels, operating parameters for the receiver can be determined by accessing a table of parameters, as shown at block 1708. For example, a table of operating parameters can be created to indicate specific bit-widths and sampling frequencies at which to operate the receiver based on given interference and SNR levels so as to meet a target BER and to minimize power consumption. For example, power consumption of an ADC varies with an operating resolution or bit-width parameter of the ADC and with a sampling rate or sampling frequency of the ADC. A higher bit-width and higher sampling frequency consumes more power. However, certain bit-widths and sampling frequencies are required to meet the target BER. Thus, optimal bit-width and sampling frequency combinations are chosen so as to meet the target BER, while minimizing power consumption of the receiver. An example table of operating parameters is shown in FIG. 16. However, specific interference levels, SNR levels, bit-widths, and sampling frequencies will depend on a communication standard being used, and an associated target BER, for example.

While the interference processing is occurring, synchronization can be taking place as well so that synchronization may be completed at a high resolution setting in parallel with signal and interference estimation. After synchronization of the receiver is completed, e.g., an SFD_complete flag is raised, as shown at block 1710, the corresponding bit-widths and sampling frequency can be assigned and used by components of the receiver, as shown at block 1712. Synchronization enables the receiver to retrieve information properly by determining when a symbol begins (e.g., timing synchronization (acquisition and tracking)) and to down-convert a baseband signal from the RF signal properly (e.g., frequency and phase synchronization).

Using the method of FIG. 17, the bit-widths and operating frequencies of the receiver that achieve a target BER are determined as a function of SNR at the input to the ADC and the interference levels in the channel. This method may avoid over consumption of power due to a functional relationship between optimal resolution (from power dissipation perspective) and input signal conditions. For example, in a ZigBee receiver in a 0.13 um technology, a difference of up to about 98% in power for different input signal conditions has been found. In exemplary embodiments, an adaptive digital receiver is provided that adjusts bit-widths and operating frequency at power efficient levels while meeting a target BER. Simulations are used to determine a relation between bit-width, operating frequency, and input signal conditions.

Figure 18:
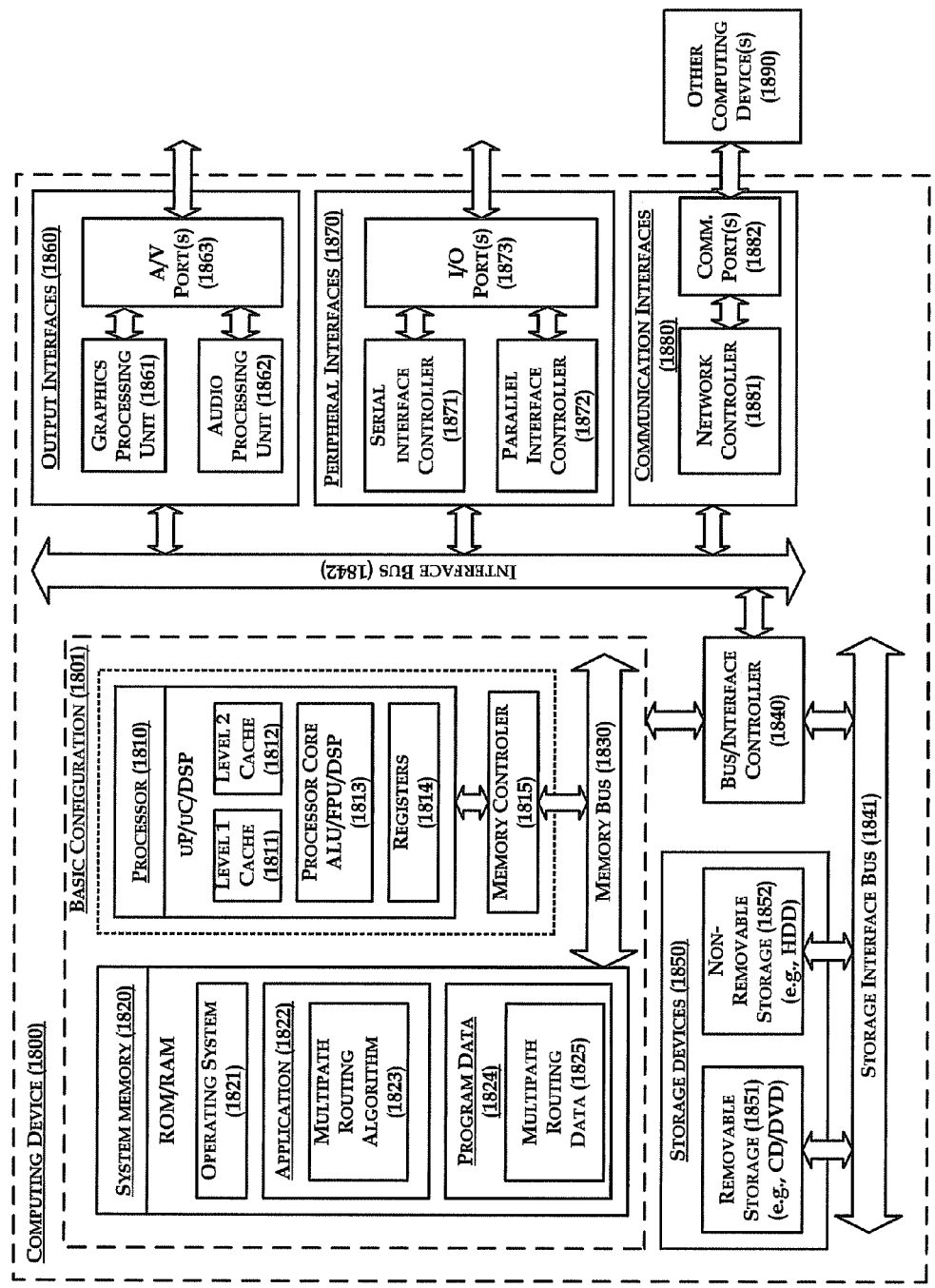
FIG. 18 is a block diagram illustrating an example computing device that is arranged for adjusting operating parameters of a receiver.

FIG. 18 is a block diagram illustrating an example computing device 1800 that is arranged for adjusting operating parameters of a receiver, in accordance with the present disclosure. In a very basic configuration 1801, computing device 1800 typically includes one or more processors 1810 and system memory 1820. A memory bus 1830 can be used for communicating between the processor 1810 and the system memory 1820.

Depending on the desired configuration, processor 1810 can be of any type including but not limited to a microprocessor ($\mu$P), a microcontroller ($\mu$C), a digital signal processor (DSP), or any combination thereof. Processor 1810 can include one more levels of caching, such as a level one cache 1811 and a level two cache 1812, a processor core 1813, and registers 1814. The processor core 1813 can include an arithmetic logic unit (ALU), a floating point unit (FPU), a digital signal processing core (DSP Core), or any combination thereof. A memory controller 1815 can also be used with the processor 1810, or in some implementations the memory controller 1815 can be an internal part of the processor 1810.

Depending on the desired configuration, the system memory 1820 can be of any type including but not limited to volatile memory (such as RAM), non-volatile memory (such as ROM, flash memory, etc.) or any combination thereof. System memory 1820 typically includes an operating system 1821, one or more applications 1822, and program data 1824. Application 1822 includes control input processing algorithm 1823 that is arranged to provide inputs to a receiver or to receiver components, in accordance with the present disclosure. Program Data 1824 includes control input data 1825 that is useful for minimizing power consumption of the receiver circuit, described above. In some example embodiments, application 1822 can be arranged to operate with program data 1824 on an operating system 1821 such that power consumption by a receiver circuit is minimized. This described basic configuration is illustrated in FIG. 18 by those components within dashed line 1801.

Computing device 1800 can have additional features or functionality, and additional interfaces to facilitate communications between the basic configuration 1801 and any required devices and interfaces. For example, a bus/interface controller 1840 can be used to facilitate communications between the basic configuration 1801 and one or more data storage devices 1850 via a storage interface bus 1841. The data storage devices 1850 can be removable storage devices 1851, non-removable storage devices 1852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1820, removable storage 1851 and non-removable storage 1852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1800. Any such computer storage media can be part of device 1800.

Computing device 1800 can also include an interface bus 1842 for facilitating communication from various interface devices (e.g., output interfaces, peripheral interfaces, and communication interfaces) to the basic configuration 1801 via the bus/interface controller 1840. Example output interfaces 1860 include a graphics processing unit 1861 and an audio processing unit 1862, which can be configured to communicate to various external devices such as a display or speakers via one or more A/V ports 1863. Example peripheral interfaces 1860 include a serial interface controller 1871 or a parallel interface controller 1872, which can be configured to communicate with external devices such as input devices (e.g., keyboard, mouse, pen, voice input device, touch input device, etc.) or other peripheral devices (e.g., printer, scanner, etc.) via one or more I/O ports 1873. An example communication interface 1880 includes a network controller 1881, which can be arranged to facilitate communications with one or more other computing devices 1890 over a network communication via one or more communication ports 1882. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1800 can also be implemented as a personal computer including both laptop computer and non-laptop computer configurations.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those slcilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Marlcush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of determining operating parameters of a receiver, the method comprising:
receiving a radio frequency (RF) input signal over a wireless channel; determining a signal strength of the RF input signal by calculating a power of interfering adjacent channels, interfering alternate channels, and desired channels in the wireless channel; determining interference in the wireless channel; setting a target bit-error-ratio (BER) at which to operate the receiver; based on the signal strength of the RF input signal and the interference in the wireless channel, determining a plurality of combinations of operating parameters for the receiver that meet the target BER; determining, from the plurality of combinations, a combination of operating parameters that minimizes power consumption by the receiver by accessing a table of bit-width and sampling frequency combinations that achieve the target BER for given signal strength and interference conditions; and receiving the RF input signal over the wireless channel according to a wireless communication standard selected from a group consisting of IEEE 802.15.4-2006, IEEE 802.11x-2006, and IEEE 802.16-2006.

2. The method of claim 1, wherein the determining the combination of operating parameters for the receiver comprises determining a bit-width and sampling frequency.

3. The method of claim 1, further comprising:
performing simulations of the receiver according to given signal strength and interference conditions;
identifying bit-width and sampling frequency combinations at which to operate the receiver and meet the target BER;
from the identified bit-width and sampling frequency combinations, selecting a combination of bit-width and sampling frequency for which the receiver consumes a least amount of power; and
based on the determined signal strength of the RF input signal and the determined interference in the wireless channel, operating the receiver at the combination of bit-width and sampling frequency selected.

4. The method of claim 1, wherein the determining the combination of operating parameters for the receiver comprises determining a resolution of the receiver.

5. The method of claim 1, further comprising determining a combination of operating parameters for the receiver for which the receiver consumes a least amount of power.

6. The method of claim 1, wherein the determining interference in the wireless channel comprises determining a power of adjacent, alternate, and desired channels in the wireless channel including:

$$P'_{adj} = \frac{1}{g^2} \sum_{n}^{N} Y_{adj}(n),$$

$$P'_{alt} = \frac{1}{g^2} \sum_{n}^{N} Y_{alt}(n),$$

$$P_{sig} = \frac{1}{g^2} \sum_{n}^{N} Y_{sig}(n)$$

wherein $P'_{adj}$ is a total power in the adjacent channels, $P'_{alt}$ is a total power in the alternate channels, and $P_{sig}$ is a power in a desired signal channel, g is a gain of a variable gain amplifier (VGA), and
$Y_{adj}(n) = Y^2_{Iadj1}(n) + Y^2_{Qadj1}(n) + Y^2_{Iadj2}(n) + Y^2_{Qadj2}(n)$,
$Y_{alt}(n) = Y^2_{Ialt1}(n) + Y^2_{Qalt1}(n) + Y^2_{Ialt2}(n) + Y^2_{Qalt2}(n)$, and
$Y_{sig}(n) = Y^2_{Isig}(n) + Y^2_{Qsig}(n)$,
wherein $Y_{Iadj1}$ and $Y_{Iadj2}$ are Ith components of adjacent channels, $Y_{Qadj1}$ and $Y_{Qadj2}$ are Qth components of adjacent channels, $Y_{Ialt1}$ and $Y_{Ialt2}$ are Ith components of alternate channels, $Y_{Qalt1}$ and $Y_{Qalt2}$ are Qth components of alternative channels, $Y_{Isig}$ is an Ith component of a desired channel, and $Y_{Qsig}$ is a Qth component of the desired channel.

7. The method of claim 6, wherein the determining the signal strength of the RF input signal comprises determining a signal-to-noise ratio (SNR) of the RF input signal including:

$$SNR = \frac{P_{sig}}{N\sigma^2} - 1,$$

where $\sigma^2$ is variance of noise contributed by an analog front end of the receiver and N is noise in the analog front end of the receiver.

8. The method of claim 1, further comprising determining operating parameters at which to operate the receiver and meet the target BER.

9. The method of claim 8, further comprising from the determined operating parameters, selecting operating parameters for which the receiver consumes a least amount of power.

10. A non-transitory computer readable medium storing executable instructions that, in response to being executed, cause a computer to perform operations comprising: receiving a radio frequency (RF) input signal over a wireless channel; determining a signal strength of the RF input signal; determining interference in the wireless channel by calculating a power of interfering adjacent channels, interfering alternate channels, and desired channels in the wireless channel; setting a target bit-error-ratio (BER) at which to operate a receiver; based on the signal strength of the RF input signal and the interference in the wireless channel, determining a plurality of combinations of operating parameters for the receiver that meet the target bit-error-ratio (BER); determining, from the plurality of combinations, a combination of operating parameters that minimizes power consumption by the receiver by accessing a table of bit-width and sampling frequency combinations that achieve the target BER for given signal strength and interference conditions; and receiving the RF input signal over the wireless channel according to a wireless communication standard selected from a group consisting of IEEE 802.15.4-2006, IEEE 802.11x-2006, and IEEE 802.16-2006.

11. A receiver comprising: an analog front end and a digital processing unit configured to: receive a radio-frequency (RF) signal over a wireless channel, and operate at a resolution and a frequency, wherein the digital processing unit comprises a phase generator, finite impulse response (FIR) matched filters, a decimator, and a demodulator, each of which is further configured to receive adjustments to the resolution and the frequency and operate at the adjusted resolution and frequency parameters; a control unit configured to: determine a signal strength of the RF signal and an interference in the wireless channel, set a target bit-error-ratio (BER) at which to operate the receiver; and based on the signal strength and the interference: determine a plurality of combinations of adjustments to the resolution and the frequency at which to operate the analog front-end and the digital processing unit, and determine, from the plurality of combinations, a combination of adjustments that minimizes power consumption by the analog front-end and the digital processing unit and meets the target bit-error-ratio (BER) for the receiver; a table that includes resolution and frequency parameters at which to operate the analog front-end and the digital processing unit for a given signal strength of the RF input signal and the interference in the wireless channel, so as to meet the target bit-error-ratio (BER) and to minimize power consumption by the receiver, wherein the control unit is configured to access the table to determine the combination of adjustments to the resolution and the frequency at which to operate the analog front-end and the digital processing unit; and receiving the RF input signal over the wireless channel according to a wireless communication standard selected from a group consisting of IEEE 802.15.4-2006, IEEE 802.11x-2006, and IEEE 802.16-2006.

12. The receiver of claim 11, wherein the control unit is configured to determine the combination of adjustments to the resolution by determining a number of bits to use during analog-to-digital conversion in the analog front-end.

13. The receiver of claim 11, wherein the control unit is configured to determine the combination of adjustments to the resolution and the frequency at which to operate the analog front-end and the digital processing unit that minimizes power consumption by the analog front-end and the digital processing unit by selecting a lowest bit-width and a lowest sampling frequency combination that meets the target BER.

14. The receiver of claim 11, wherein the control unit is configured to determine the resolution and the frequency operating parameters at which to operate the analog front-end and the digital processing unit and to meet the target BER.

15. The receiver of claim 14, wherein the control unit is configured to select from the determined resolution and frequency operating parameters, operating parameters for which the analog front-end and the digital processing unit consume a least amount of power.

\* \* \* \* \*

UNITED STATES PATENT AND TRADEMARK OFFICE
CERTIFICATE OF CORRECTION

PATENT NO. : 8,737,547 B2
APPLICATION NO. : 12/645695
DATED : May 27, 2014
INVENTOR(S) : Amrutur et al.

It is certified that error appears in the above-identified patent and that said Letters Patent is hereby corrected as shown below:

In the Drawings

In Fig. 18, Sheet 15 of 15, for Tag "(1815)", in Line 1, delete "MEMORY CONTROLER" and insert -- MEMORY CONTROLLER --, therefor.

In the Specification

In Column 4, Lines 50-51, delete "perfou ance" and insert -- performance --, therefor.

In Column 5, Line 61, delete "Zigbbee" and insert -- Zigbee --, therefor.

In Column 6, Line 66, delete "$S_{mo}$," and insert -- $S_{mo}$ --, therefor.

In Column 7, Line 30, delete "analog frontend 202" and insert -- analog frontend 204 --, therefor.

In Column 7, Line 43, in Equation (8), delete " $SNR_{de\,mod}^{avail} = \dfrac{S_{FE}}{N_{tot}}$ " and insert -- $SNR_{demod}^{avail} = \dfrac{S_{FE}}{N_{tot}}$ --, therefor.

In Column 7, Line 48, delete " $SNR_{de\,mod}^{avail}$ " and insert -- $SNR_{demod}^{avail}$ --, therefor.

Signed and Sealed this
Fourth Day of November, 2014

Michelle K. Lee
*Deputy Director of the United States Patent and Trademark Office*

CERTIFICATE OF CORRECTION (continued)
U.S. Pat. No. 8,737,547 B2

In Column 7, Line 55, delete "$SNR_{de\ mod}^{avail} \geq SN_{demod}$" and insert -- $SNR_{demod}^{avail} \geq SN_{demod}$ --, therefor.

In Column 9, Lines 8-10, in Equation (11), delete "
$$rec(t) = Re\left\{ \begin{array}{l} x_0 e^{j(2\pi f_c + \theta_0)} + x_1 e^{j(2\pi f_1 t + \theta_1)} + x_2 e^{j(2\pi f_2 t + \theta_2)} + \\ x_3 e^{j(2\pi f_3 t + \theta_3)} + x_4 e^{j(2\pi f_4 t + \theta_4)} \end{array} \right\}$$
" and insert -- 
$$rec(t) = Re\left\{ \begin{array}{l} x_0 e^{j(2\pi f_c t + \theta_0)} + x_1 e^{j(2\pi f_1 t + \theta_1)} + x_2 e^{j(2\pi f_2 t + \theta_2)} + \\ x_3 e^{j(2\pi f_3 t + \theta_3)} + x_4 e^{j(2\pi f_4 t + \theta_4)} \end{array} \right\}$$
--, therefor.

In Column 12, Lines 58-59, delete "acquisition unit 100" and insert -- acquisition unit 1000 --, therefor.

In Column 13, Line 36, delete "acquisition unit 100." and insert -- acquisition unit 1000. --, therefor.

In Column 14, Line 44, delete "hase" and insert -- phase --, therefor.

In Column 15, Line 37, delete "controller 612." and insert -- controller 610. --, therefor.

In Column 20, Line 30, delete "slcilled" and insert -- skilled --, therefor.

In Column 20, Line 60, delete "Marlcush" and insert -- Markush --, therefor.